United States Patent
Iyoda et al.

(10) Patent No.: US 8,341,705 B2
(45) Date of Patent: Dec. 25, 2012

(54) METHOD, APPARATUS, AND COMPUTER PRODUCT FOR MANAGING OPERATION

(75) Inventors: Satoshi Iyoda, Kawasaki (JP);
Yoshinobu Hibi, Kawasaki (JP);
Masayuki Naitou, Kawasaki (JP);
Shigehiro Yoshikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 230 days.

(21) Appl. No.: 11/786,454

(22) Filed: Apr. 11, 2007

(65) Prior Publication Data

US 2007/0283422 A1    Dec. 6, 2007

Related U.S. Application Data

(63) Continuation of application No. PCT/JP2004/015037, filed on Oct. 12, 2004.

(51) Int. Cl.
*H04L 9/32* (2006.01)
(52) U.S. Cl. ............... 726/4; 726/7; 713/168; 713/170; 709/218; 709/219; 709/229
(58) Field of Classification Search .................. 713/150, 713/155, 182, 185, 165–168, 170; 726/1–8, 726/26, 27; 709/223–229, 218, 219
See application file for complete search history.

(56) References Cited

U.S. PATENT DOCUMENTS

| | | | |
|---|---|---|---|
| 6,104,716 A * | 8/2000 | Crichton et al. ............. 370/401 |
| 6,236,996 B1 | 5/2001 | Bapat et al. | |
| 7,016,980 B1 | 3/2006 | Mayer et al. | |
| 7,284,000 B2 * | 10/2007 | Kuehr-McLaren et al. ...... 707/9 |
| 7,533,157 B2 * | 5/2009 | Hu et al. ....................... 709/219 |
| 2002/0023143 A1 * | 2/2002 | Stephenson et al. .......... 709/218 |
| 2002/0087447 A1 * | 7/2002 | McDonald et al. ............ 705/36 |
| 2002/0178119 A1 * | 11/2002 | Griffin et al. ................... 705/54 |
| 2003/0221012 A1 * | 11/2003 | Herrmann et al. ............ 709/229 |
| 2004/0268151 A1 * | 12/2004 | Matsuda ...................... 713/201 |
| 2005/0015386 A1 * | 1/2005 | Mortensen et al. ........... 707/100 |
| 2005/0021498 A1 * | 1/2005 | Boreham et al. ................. 707/1 |
| 2005/0144114 A1 * | 6/2005 | Ruggieri et al. ................ 705/37 |
| 2005/0169315 A1 * | 8/2005 | Jiang et al. .................... 370/493 |
| 2005/0198380 A1 * | 9/2005 | Panasyuk et al. ............. 709/239 |

(Continued)

FOREIGN PATENT DOCUMENTS

EP    0 977 399    2/2000

(Continued)

OTHER PUBLICATIONS

Search Report issued by European Patent Office for corresponding application EP 04 79 2281 mailed Jul. 20, 2011.

(Continued)

*Primary Examiner* — Kambiz Zand
*Assistant Examiner* — Tongoc Tran
(74) *Attorney, Agent, or Firm* — Greer, Burns & Crain, Ltd.

(57) ABSTRACT

Administrative right information corresponding to a domain and a service group, domain information, and service group information are stored in a system resource DB. When an administrator makes a request for operating a resource using an operation management client, an authority determining unit of a system resource manager makes a determination whether the administrator has an administrative right for a domain or a service group to which the requested resource belongs using the information stored in the system resource DB, and permits or denies the operation based on a result of determination.

5 Claims, 24 Drawing Sheets

U.S. PATENT DOCUMENTS

2005/0273346 A1* 12/2005 Frost .................................. 705/1
2006/0047556 A1* 3/2006 Lang et al. ........................ 705/9

FOREIGN PATENT DOCUMENTS

| | | |
|---|---|---|
| EP | 0 992 873 | 4/2000 |
| JP | 10-111833 | 4/1998 |
| JP | 2000-112891 | 4/2000 |
| JP | 2001-202303 | 7/2001 |
| JP | 2001-237895 | 8/2001 |
| JP | 2003-132030 | 5/2003 |
| JP | 2003-141085 | 5/2003 |
| JP | 2003-162449 | 6/2003 |
| JP | 2003-316745 | 11/2003 |
| JP | 2003-318990 | 11/2003 |
| JP | 2003-330622 | 11/2003 |
| JP | 2004-013533 | 1/2004 |
| WO | WO 02067540 A1 * | 8/2002 |
| WO | WO 2004/107139 | 12/2004 |

OTHER PUBLICATIONS

Office Action issued by the Patent Office of Japan for corresponding Japanese Application No. 2006-540796 issued Aug. 6, 2010.

Office Action issued by the Patent Office of Japan for corresponding Japanese Application No. 2006-540796 mailed Mar. 8, 2011.

* cited by examiner

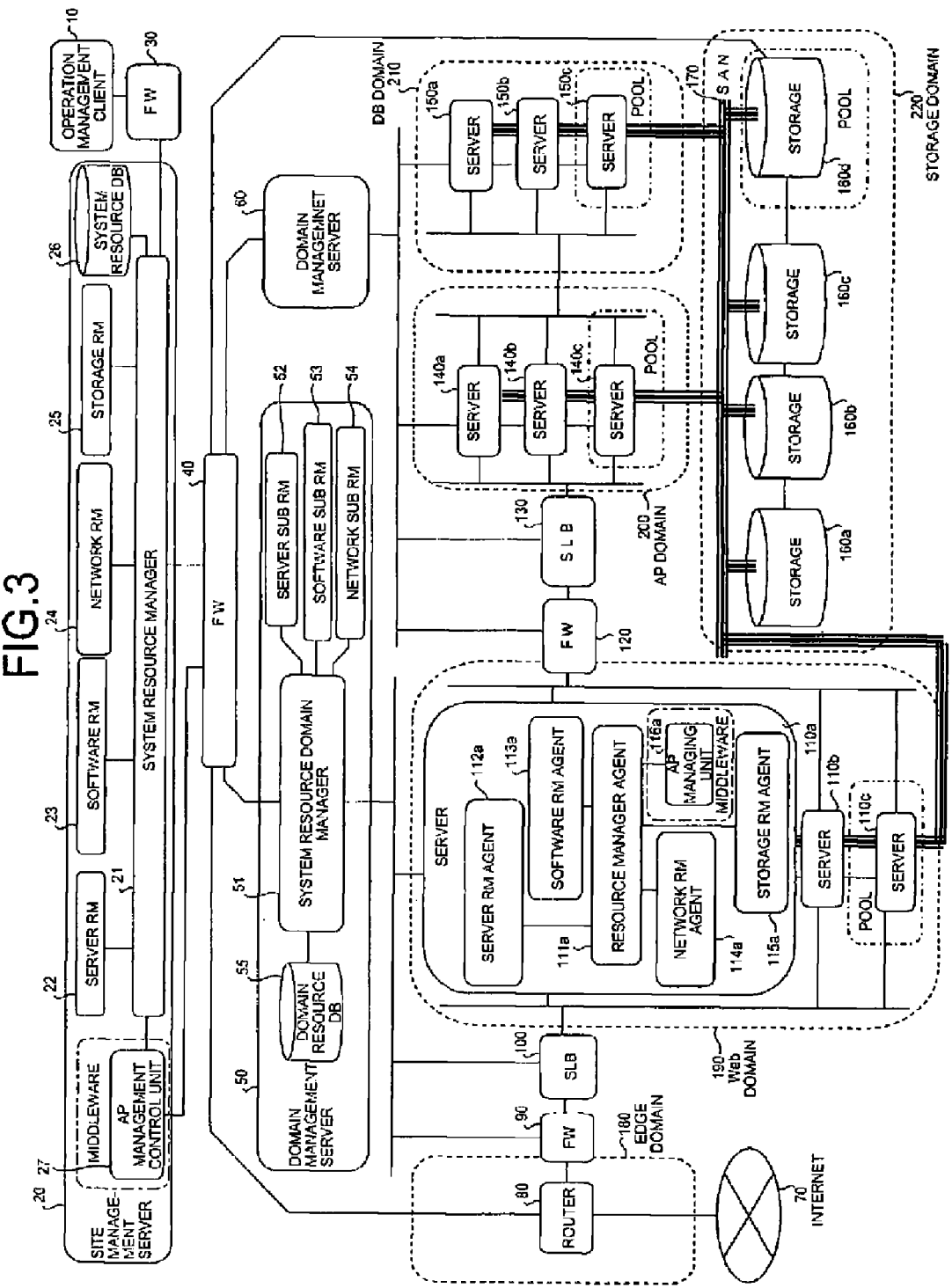

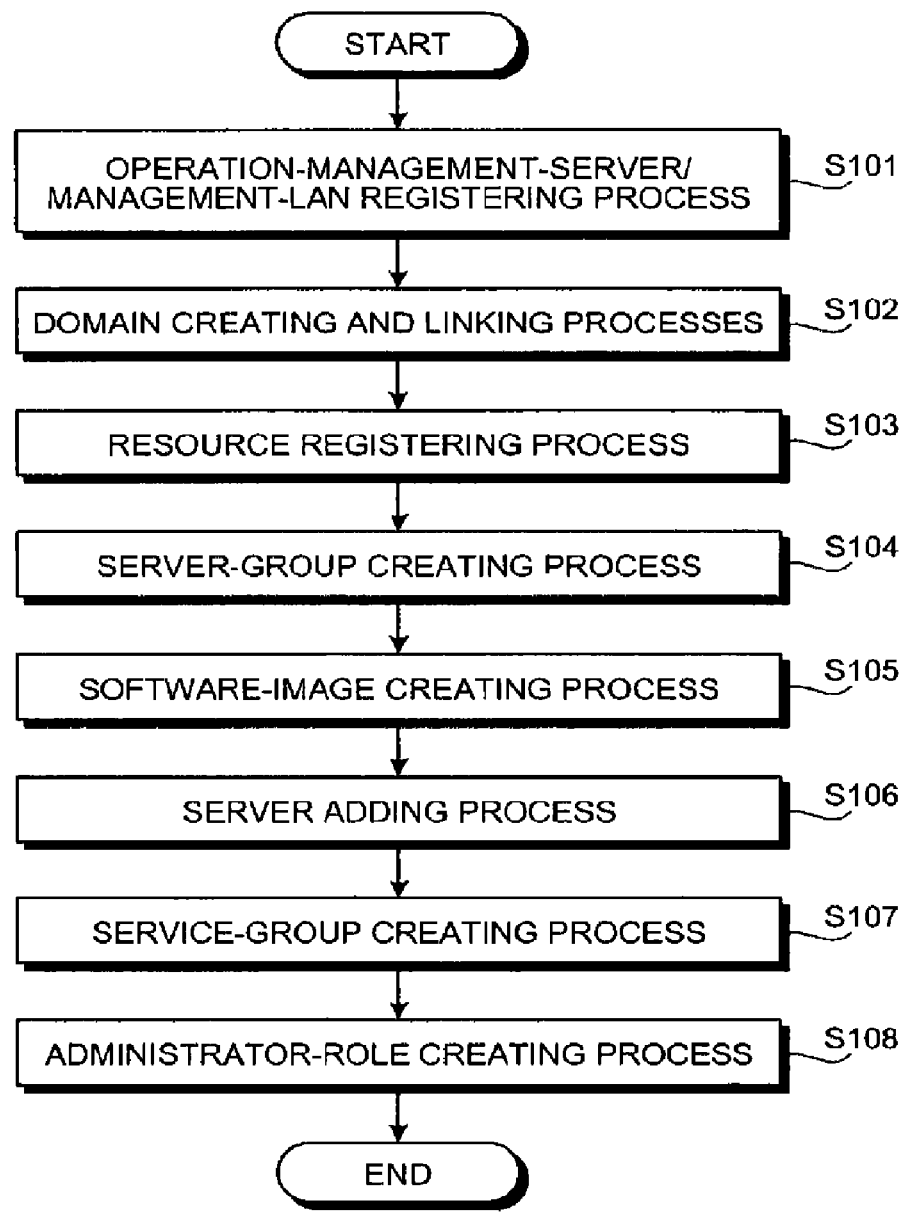

FIG.5

SITE DATA
300

| SITE NAME | SITE MANAGEMENT SERVER NAME | DOMAIN MANAGEMENT SERVER NAME |
|---|---|---|
| DataCenter | SiteAdminSvrA | DomainAdminSvrA |
| | | DomainAdminSvr B |

FIG.6

DOMAIN MANAGEMENT SERVER DATA
310

| DOMAIN MANAGEMENT SERVER NAME | MANAGEMENT SUBNET NAME |
|---|---|
| DomainAdminSvrA | AdminSubnetA |
| | AdminSubnetB |
| DomainAdminSvrB | AdminSubnetC |

FIG.7

MANAGEMENT SUBNET DATA
320

| MANAGEMENT SUBNET NAME | NETWORK ADDRESS | NETMASK | DEFAULT GATEWAY |
|---|---|---|---|
| AdminSubnetA | 192.168.1.0 | 255.255.255.0 | 192.168.1.1 |
| AdminSubnetB | 192.168.2.0 | 255.255.255.0 | 192.168.2.1 |
| AdminSubnetC | 192.168.3.0 | 255.255.255.0 | 192.168.3.1 |

FIG.8

MIDDLEWARE COOPERATION IF DATA
330

| MIDDLEWARE NAME | TARGET EVENT | TIMING | LOCATION | EXECUTION COMMAND |
|---|---|---|---|---|
| MW_A | SERVER GROUP CREATION | BEFORE<br>AFTER | Manager<br>Manager | –<br>issvgrp add |
| | SERVER GROUP DELETE | BEFORE<br>AFTER | Manager<br>Manager | issvgrp del<br>– |
| | SERVER ADDITION | BEFORE<br>AFTER | Manager<br>Manager<br>Agent | isserver check<br>isserver add<br>– |
| | SERVER DELETE | BEFORE<br>AFTER | Manager<br>Agent<br>Manager | isserver del<br>–<br>– |
| | SOFTWARE IMAGE EXTRACTION | BEFORE<br>AFTER | Manager<br>Agent<br>Manager<br>Agent | –<br>isproc stop<br>–<br>isproc start |
| | SOFTWARE IMAGE DISTRIBUTION | BEFORE<br>AFTER | Manager<br>Manager<br>Agent | isserver check<br>isserver update<br>isproc start |

FIG.9

SERVER DOMAIN DATA
340

| SERVER DOMAIN NAME | SERVER ARCHITECTURE NAME | MANAGEMENT SUBNET NAME |
|---|---|---|
| Web_domain | ARC_A | AdminSubnetA |
| AP_domain | ARC_B | AdminSubnetB |
| DB_domain | ARC_C | AdminSubnetC |

FIG.10

POOL GROUP DATA
350

| POOL GROUP NAME | TYPE | SERVER DOMAIN NAME |
|---|---|---|
| Web_domain.pool | SERVER GROUP SHARING | Web_domain |
| AP_domain.pool | SERVER GROUP SHARING | AP_domain |
| DB_domain.pool | SERVER GROUP SHARING | |
| A_DB.pool | SERVER GROUP ONLY | DB_domain |
| B_DB.pool | SERVER GROUP ONLY | |

FIG.11

STORAGE DOMAIN DATA
360

| STORAGE DOMAIN NAME | REDUNDANCY OF PATH |
|---|---|
| Web_AP_DISK_domain | 2 |
| DB_DISK_domain | 4 |

FIG.12

NETWORK BOOT SERVER DATA
690

| MAC ADDRESS | IP ADDRESS | HOST NAME |
|---|---|---|
| 00:00:E2:6F:55:01 | 192.168.1.2 | host1 |
| UNASSIGNED (AUTO) | 192.168.1.3 | host2 |
| UNASSIGNED (AUTO) | 192.168.1.4 | host3 |

FIG.13

MANAGEMENT TARGET SERVER DATA
700

| SERVER NAME | IP ADDRESS | MAC ADDRESS | SERVER ARCHITECTURE NAME | MODEL NAME | SAN BOOT | STATUS |
|---|---|---|---|---|---|---|
| host1 | 192.168.1.2 | 00:00:E2:6E:55:01 | ARC_A | MODEL_A | O | NORMAL |
| host2 | 192.168.1.3 | 00:00:E2:6E:55:02 | ARC_A | MODEL_A | O | NORMAL |
| host3 | 192.168.1.4 | 00:00:E2:6E:55:03 | ARC_A | MODEL_A | O | NORMAL |
| host4 | 192.168.1.5 | 00:00:E2:6E:55:04 | ARC_A | MODEL_A | O | NORMAL |
| host5 | 192.168.1.6 | 00:00:E2:6E:55:05 | ARC_A | MODEL_A | O | NORMAL |
| host6 | 192.168.2.2 | 00:00:E2:6E:55:06 | ARC_B | MODEL_B | O | NORMAL |
| host7 | 192.168.2.3 | 00:00:E2:6E:55:07 | ARC_B | MODEL_B | O | NORMAL |
| host8 | 192.168.2.4 | 00:00:E2:6E:55:08 | ARC_B | MODEL_B | O | NORMAL |
| host9 | 192.168.2.5 | 00:00:E2:6E:55:09 | ARC_B | MODEL_B | O | NORMAL |
| host10 | 192.168.2.6 | 00:00:E2:6E:55:0A | ARC_B | MODEL_B | O | NORMAL |
| host11 | 192.168.3.2 | 00:00:E2:6E:55:0B | ARC_C | MODEL_C | O | NORMAL |
| host12 | 192.168.3.3 | 00:00:E2:6E:55:0C | ARC_C | MODEL_C | O | NORMAL |
| host13 | 192.168.3.4 | 00:00:E2:6E:55:0D | ARC_C | MODEL_C | O | NORMAL |
| host14 | 192.168.3.5 | 00:00:E2:6E:55:0E | ARC_C | MODEL_C | O | NORMAL |
| host15 | 192.168.3.6 | 00:00:E2:6E:55:0F | ARC_C | MODEL_C | O | NORMAL |

FIG.14

PROVISIONING CONFIGURATION DATA
710 

| SERVER NAME | POOL GROUP NAME | SERVER GROUP NAME | STORAGE SUB-GROUP NAME | ACCESS-IBILITY |
|---|---|---|---|---|
| host 1 | Web_domain.pool | – | – | – |
| host 2 | Web_domain.pool | – | – | – |
| host 3 | Web_domain.pool | – | – | – |
| host 4 | Web_domain.pool | – | – | – |
| host 5 | Web_domain.pool | – | – | – |
| host 6 | AP_domain.pool | – | – | – |
| host 7 | AP_domain.pool | – | – | – |
| host 8 | AP_domain.pool | – | – | – |
| host 9 | AP_domain.pool | – | – | – |
| host 10 | AP_domain.pool | – | – | – |
| host 11 | DB_domain.pool | – | – | – |
| host 12 | DB_domain.pool | – | – | – |
| host 12 | DB_domain.pool | – | – | – |
| host 14 | DB_domain.pool | – | – | – |
| host 15 | DB_domain.pool | – | – | – |

FIG.15

STORAGE TEMPLATE DATA
800

| STORAGE TEMPLATE NAME | DISK TYPE | DISK NAME | RELIABILITY NEED | LOAD LEVEL | DISK CAPACITY | BOOT DISK |
|---|---|---|---|---|---|---|
| A_Web_Str_template | root | disk1 | HIGH | NORMAL | 50 GB | ○ |
| | local | disk2 | HIGH | NORMAL | 100 GB | × |
| | local | disk3 | HIGH | HIGH | 200 GB | × |
| B_Web_Str_template | root | disk1 | HIGH | NORMAL | 50 GB | ○ |
| | local | disk2 | HIGH | NORMAL | 50 GB | × |
| | local | disk3 | HIGH | HIGH | 100 GB | × |
| A_AP_Str_template | root | disk1 | HIGH | NORMAL | 200 GB | ○ |
| | local | disk2 | HIGH | HIGH | 200 GB | × |
| B_AP_Str_template | root | disk1 | HIGH | HIGH | 100 GB | ○ |
| | local | disk2 | HIGH | HIGH | 100 GB | × |
| A_DB_Str_template | root | disk1 | HIGH | NORMAL | 100 GB | ○ |
| | local | disk2 | HIGH | HIGH | 100 GB | × |
| | shared | disk3 | HIGH | HIGH | 500 GB | × |
| B_DB_Str_template | root | disk1 | HIGH | NORMAL | 100 GB | ○ |
| | local | disk2 | HIGH | HIGH | 100 GB | × |
| | shared | disk3 | HIGH | HIGH | 250 GB | × |
| A_Batch_Str_template | root | disk1 | HIGH | NORMAL | 200 GB | ○ |

FIG.16

SERVER GROUP DATA
810

| SERVER GROUP NAME | SERVER DOMAIN NAME | SOFTWARE DISTRIBUTION IMAGE NAME | VERSION | STORAGE TEMPLATE NAME | SAN BOOT | AUTO RECOVERY |
|---|---|---|---|---|---|---|
| A_Web | Web_domain | A_OS_Web_image | 1.0 | A_Web_Str_template | O | × |
| B_Web | Web_domain | B_OS_Web_image | 1.1 | B_Web_Str_template | O | × |
| A_AP | AP_domain | A_OS_AP_image | 1.3 | A_AP_Str_template | O | O |
| B_AP | AP_domain | B_OS_AP_image | 1.6 | B_AP_Str_template | O | O |
| A_DB | DB_domain | C_OS_DB_A_image | 1.0 | A_DB_Str_template | O | × |
| B_DB | DB_domain | C_OS_DB_B_image | 1.0 | B_DB_Str_template | O | × |
| A_Batch | DB_domain | C_OS_Batch_image | 1.1 | A_Batch_Str_template | O | × |

FIG.17

PROVISIONING CONFIGURATION DATA
960

| SERVER NAME | POOL GROUP NAME | SERVER GROUP NAME | STORAGE SUB-GROUP NAME | ACCESS-IBILITY |
|---|---|---|---|---|
| host1 | – | A_Web | A_Web_rootdisk_host1 | O |
| | | | A_Web_localdisk_host1 | O |
| host 2 | – | A_Web | A_Web_rootdisk_host2 | O |
| | | | A_Web_localdisk_host2 | O |
| host 3 | – | B_Web | B_Web_rootdisk_host3 | O |
| | | | A_Web_localdisk_host3 | O |
| host 4 | – | B_Web | B_Web_rootdisk_host4 | O |
| | | | A_Web_localdisk_host4 | O |
| host 5 | Web_domain.pool | – | A_Web_rootdisk_host5 | × |
| | | | A_Web_localdisk_host5 | × |
| | | | B_Web_rootdisk_host5 | × |
| | | | B_Web_localdisk_host5 | × |
| host 6 | – | A_AP | A_AP_rootdisk_host6 | O |
| | | | A_AP_localdisk_host6 | O |
| host 7 | – | A_AP | A_AP_rootdisk_host7 | O |
| | | | A_AP_localdisk_host7 | O |
| host 8 | – | B_AP | B_AP_rootdisk_host8 | O |
| | | | B_AP_localdisk_host8 | O |
| host 9 | – | B_AP | B_AP_rootdisk_host9 | O |
| | | | B_AP_localdisk_host9 | O |
| host10 | AP_domain.pool | – | – | – |
| host 11 | – | A_DB | A_DB_rootdisk_host11 | O |
| | | | A_DB_localdisk_host11 | O |
| | | | A_Batch_rootdisk_host11 | × |
| host 12 | – | A_DB | A_DB_rootdisk_host12 | O |
| | | | A_DB_localdisk_host12 | O |
| | | | A_Batch_rootdisk_host12 | × |
| host 13 | – | B_DB | B_DB_rootdisk_host13 | O |
| | | | B_DB_localdisk_host13 | O |
| host 14 | – | B_DB | B_DB_rootdisk_host14 | O |
| | | | B_DB_localdisk_host14 | O |
| host15 | B_DB_domain.pool | – | – | – |

SERVICE DATA
1181

| SERVICE NAME | SERVER GROUP NAME | STATUS INFORMATION |
|---|---|---|
| A_Web_svc | A_Web | normal |
| B_Web_svc | B_Web | normal |
| A_AP_svc | A_AP | normal |
| B_AP_svc | B_AP | normal |
| A_DB_svc | A_DB | normal |
| B_DB_svc | B_DB | normal |
| A_Batch_svc | A_Batch | normal |

SERVICE GROUP DATA
1182

| SERVICE GROUP NAME | SERVICE NAME |
|---|---|
| A_Service | A_Web_svc |
|  | A_AP_svc |
|  | A_DB_svc |
|  | A_Batch_svc |
| B_Service | B_Web_svc |
|  | B_AP_svc |
|  | B_DB_svc |

FIG.20

ADMINISTRATOR DATA
1183

| ADMINISTRATOR NAME | PASSWORD |
|---|---|
| root | ******* |
| monitor | ******* |
| dmz_mgr | ******* |
| db_mgr | ******* |
| apdb_mon | ******* |
| a_user | ******* |
| ab_mon | ******* |
| b_user | ******* |

FIG.21

ADMINISTRATOR ROLE DATA
1184

| | root | monitor | d mz_mgr | db_mgr | apdb_mon | a_user | ab_mon | b_user |
|---|---|---|---|---|---|---|---|---|
| SITE MANAGEMENT | rw | ro | | | | | | |
| Web_domain | rw | ro | rw | ro | | | | |
| AP_domain | rw | ro | rw | ro | ro | | | |
| DB_domain | rw | ro | | rw | ro | | | |
| Web_AP_DISK_domain | rw | ro | rw | | | | | |
| DB_DISK_domain | rw | ro | | | | | | |
| A_Service | rw | ro | | | | rw | ro | rw |
| B_Service | rw | ro | | | | | ro | | rw : ACCESS (READ) AND UPDATE (WRITE)  ro : ACCESS (READ) ONLY

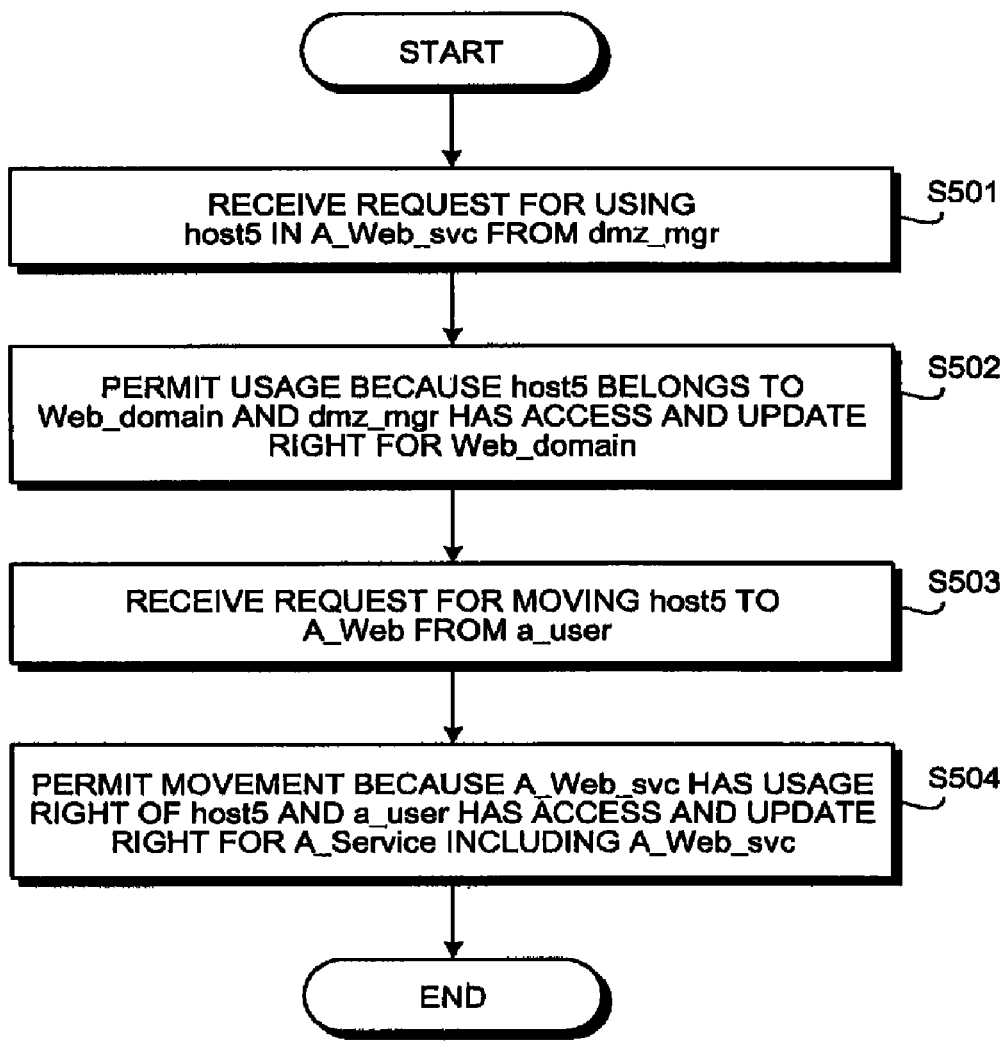

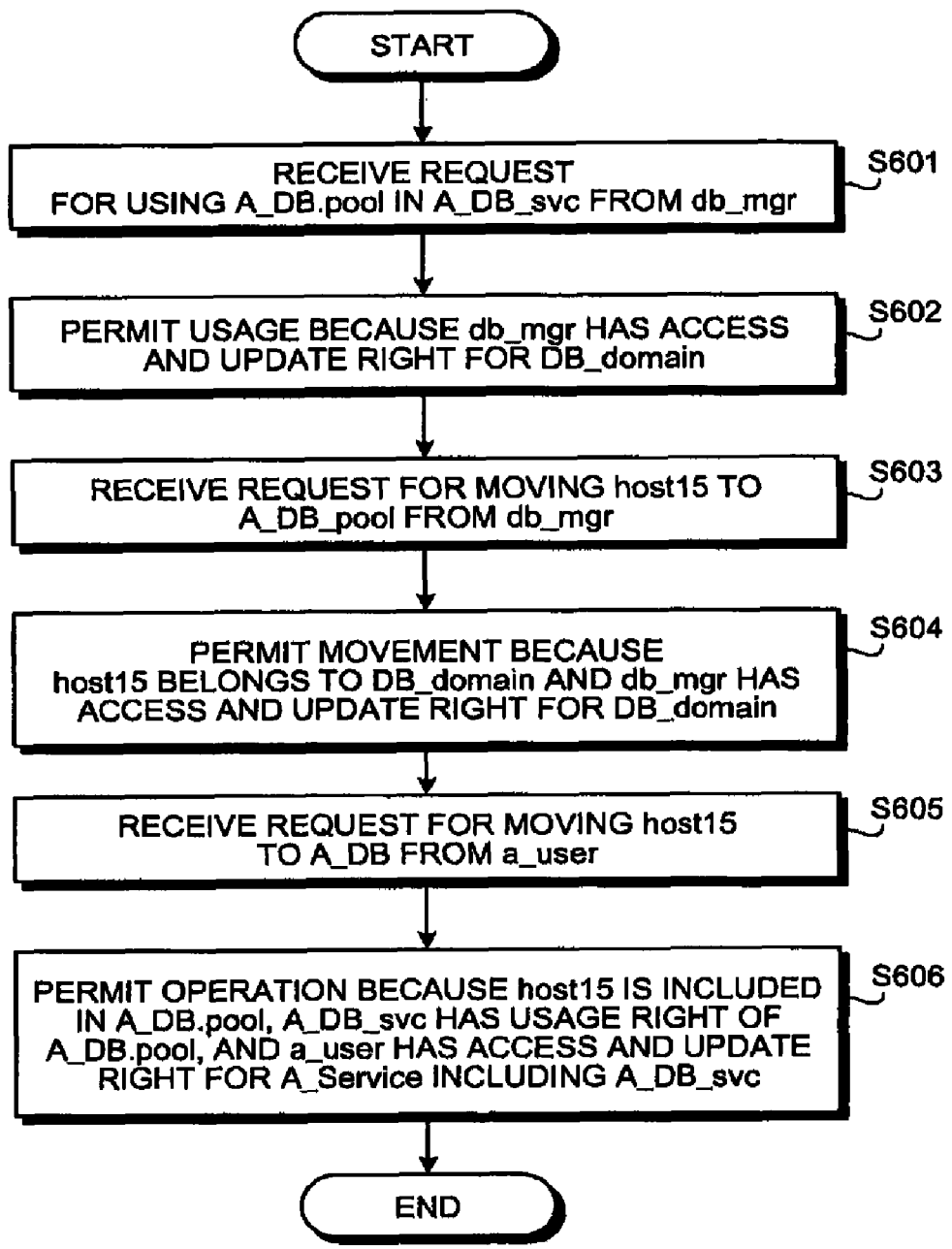

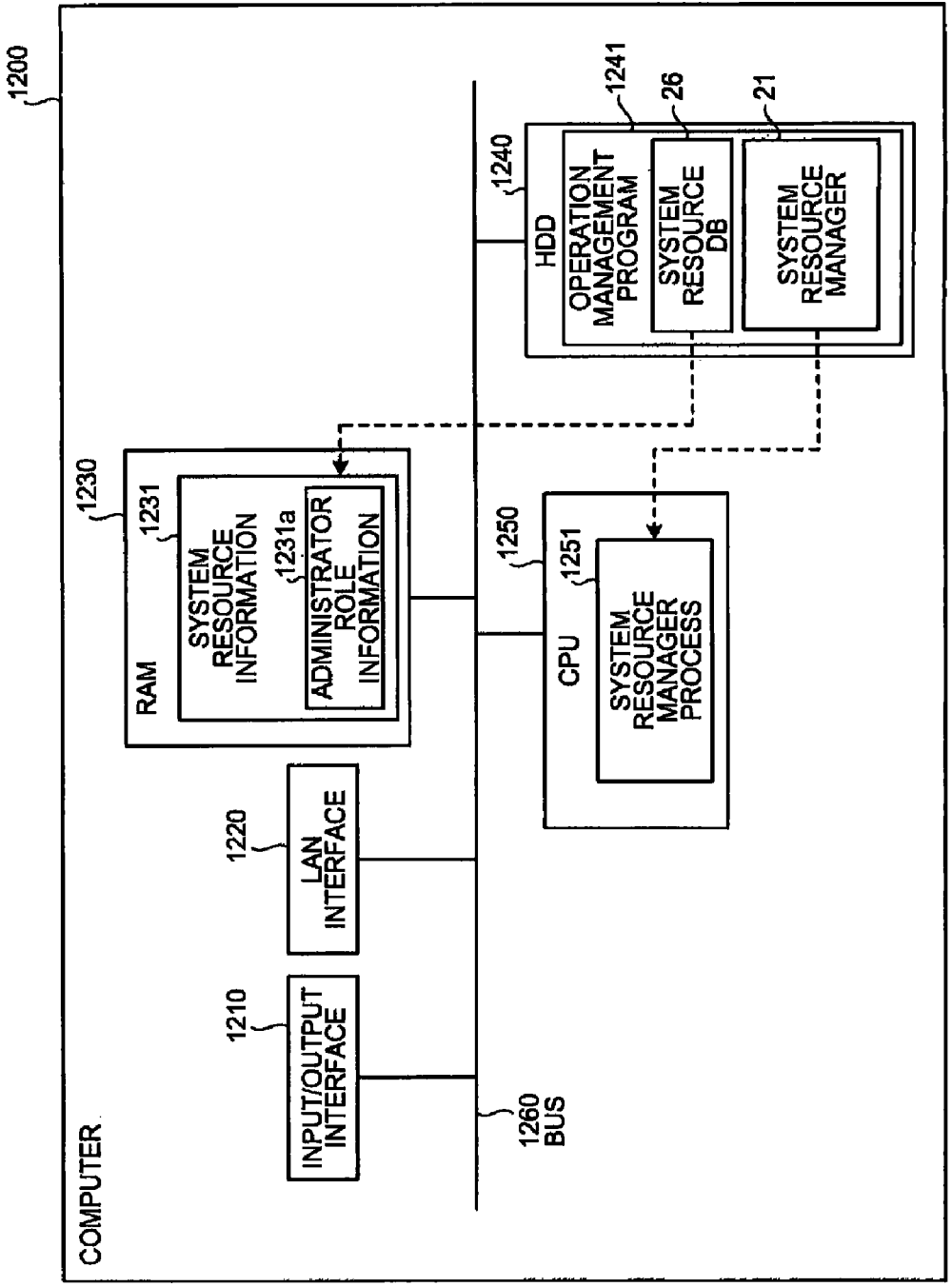

METHOD, APPARATUS, AND COMPUTER PRODUCT FOR MANAGING OPERATION

This is a continuation filed under 35 U.S.C. §111(a), of International Application No. PCT/JP2004/015037, filed Oct. 12, 2004.

BACKGROUND OF THE INVENTION

1. Field of the Invention

The present invention relates to a technology for managing an access right and an update right of an administrator for resources constituting an information processing system as an administrative right with a capability of facilitating a setting of the administrative right from a viewpoint of security level of the resources and a service.

2. Description of the Related Art

In a conventional method of managing resources constituting an information processing system, a plurality of administrators is registered for a resource or available resources are registered for each administrator on an operation management software.

An access-right managing technology is disclosed in Japanese Patent Application Laid-open No. 2003-141085, in which administrators are registered in a hierarchical administrator class, and an administrator belonging to an upper hierarchical class can take over an operation that can be performed by an administrator belonging to a lower hierarchical class.

However, when a plurality of services is provided in a large-scale system such as a data center, it is often the case that resources are managed in units of security level or service. Such resource management requires registration of administrative right in units of each resource, which results in a problem that it is difficult to set the administrative right.

SUMMARY OF THE INVENTION

It is an object of the present invention to at least partially solve the problems in the conventional technology.

A computer-readable recording medium according to one aspect of the present invention stores therein a computer program for managing an access right and an update right of an administrator for resources constituting an information processing system as an administrative right. The computer program causes a computer to execute setting an administrative right for a resource domain that is a group of resources each of which having a uniform physical wire connection with other resources; and determining, when a request for operating a resource is received from a resource administrator, an authorization of the request based on the administrative right set to the administrator at the setting for a resource domain to which the resource belongs.

Furthermore, a computer-readable recording medium according to another aspect of the present invention stores therein a computer program for managing an access right and an update right of an administrator for resources constituting an information processing system as an administrative right. The computer program causes a computer to execute setting an administrative right for a service group that is a group of servers each of which performing a service processing in cooperation with other servers; and determining, when a request for operating a resource is received from a resource administrator, an authorization of the request based on the administrative right set to the administrator at the setting for a service group to which the resource belongs.

Moreover, a method according to still another aspect of the present invention is for managing an access right and an update right of an administrator for resources constituting an information processing system as an administrative right. The method includes setting an administrative right for a resource domain that is a group of resources each of which having a uniform physical wire connection with other resources; and determining, when a request for operating a resource is received from a resource administrator, an authorization of the request based on the administrative right set to the administrator at the setting for a resource domain to which the resource belongs.

Furthermore, a method according to still another aspect of the present invention is for managing an access right and an update right of an administrator for resources constituting an information processing system as an administrative right. The method includes setting an administrative right for a service group that is a group of servers each of which performing a service processing in cooperation with other servers; and determining, when a request for operating a resource is received from a resource administrator, an authorization of the request based on the administrative right set to the administrator at the setting for a service group to which the resource belongs.

Moreover, an apparatus according to still another aspect of the present invention is for managing an access right and an update right of an administrator for resources constituting an information processing system as an administrative right. The apparatus includes a right setting unit that sets an administrative right for a resource domain that is a group of resources each of which having a uniform physical wire connection with other resources; and an operation-request-authorization determining unit that determines, when a request for operating a resource is received from a resource administrator, an authorization of the request based on the administrative right set to the administrator by the right setting unit for a resource domain to which the resource belongs.

Furthermore, an apparatus according to still another aspect of the present invention is for managing an access right and an update right of an administrator for resources constituting an information processing system as an administrative right. The apparatus includes a right setting unit that sets an administrative right for a service group that is a group of servers each of which performing a service processing in cooperation with other servers; and an operation-request-authorization determining unit that determines, when a request for operating a resource is received from a resource administrator, an authorization of the request based on the administrative right set to the administrator by the right setting unit for a service group to which the resource belongs.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram of a functional configuration of an operation management system according to the embodiment;

FIG. 4 is a flowchart of a processing procedure for assigning a server to a task according to the embodiment;

FIG. 5 is a diagram of an example of site data registered as information on an operation management server;

FIG. 6 is a diagram of an example of domain management server data registered as information on domain management servers;

FIG. 7 is a diagram of an example of management subnet data registered as information on subnets to be managed;

FIG. 8 is a diagram of an example of middleware cooperation IF data including commands for performing various processes in cooperation with middleware;

FIG. 9 is a diagram of an example of server domain data stored as information on server domains to which servers belong;

FIG. 10 is a diagram of an example of pool group data stored as information on pool groups;

FIG. 11 is a diagram of an example of storage domain data stored as information on storage domains;

FIG. 12 is a diagram of an example of network boot server data stored as information on network boot servers;

FIG. 13 is a diagram of an example of management target server data stored as information on servers to be managed;

FIG. 14 is a diagram of an example of provisioning configuration data stored as information on groups to which servers belong;

FIG. 15 is a diagram of an example of storage template data stored as information on storage templates;

FIG. 16 is a diagram of an example of server group data stored as information on server groups;

FIG. 17 is a diagram of an example of provisioning configuration data in which storage sub-groups are specified;

FIG. 20 is a diagram of an example of administrator data;

FIG. 21 is a diagram of an example of administrator role data;

FIG. 28 is a flowchart of a third example of the resource operation performed by the system resource manager in response to a resource-operation request from an administrator;

FIG. 29 is a flowchart of a fourth example of the resource operation performed by the system resource manager in response to a resource-operation request from an administrator; and FIG. 30 is a diagram of a computer that executes the operation management program according to the embodiment.

DETAILED DESCRIPTION OF THE PREFERRED EMBODIMENTS

Exemplary embodiments of the present invention are explained in detail below with reference to the accompanying drawings. The present invention is not limited to the embodiments.

Figure 1:
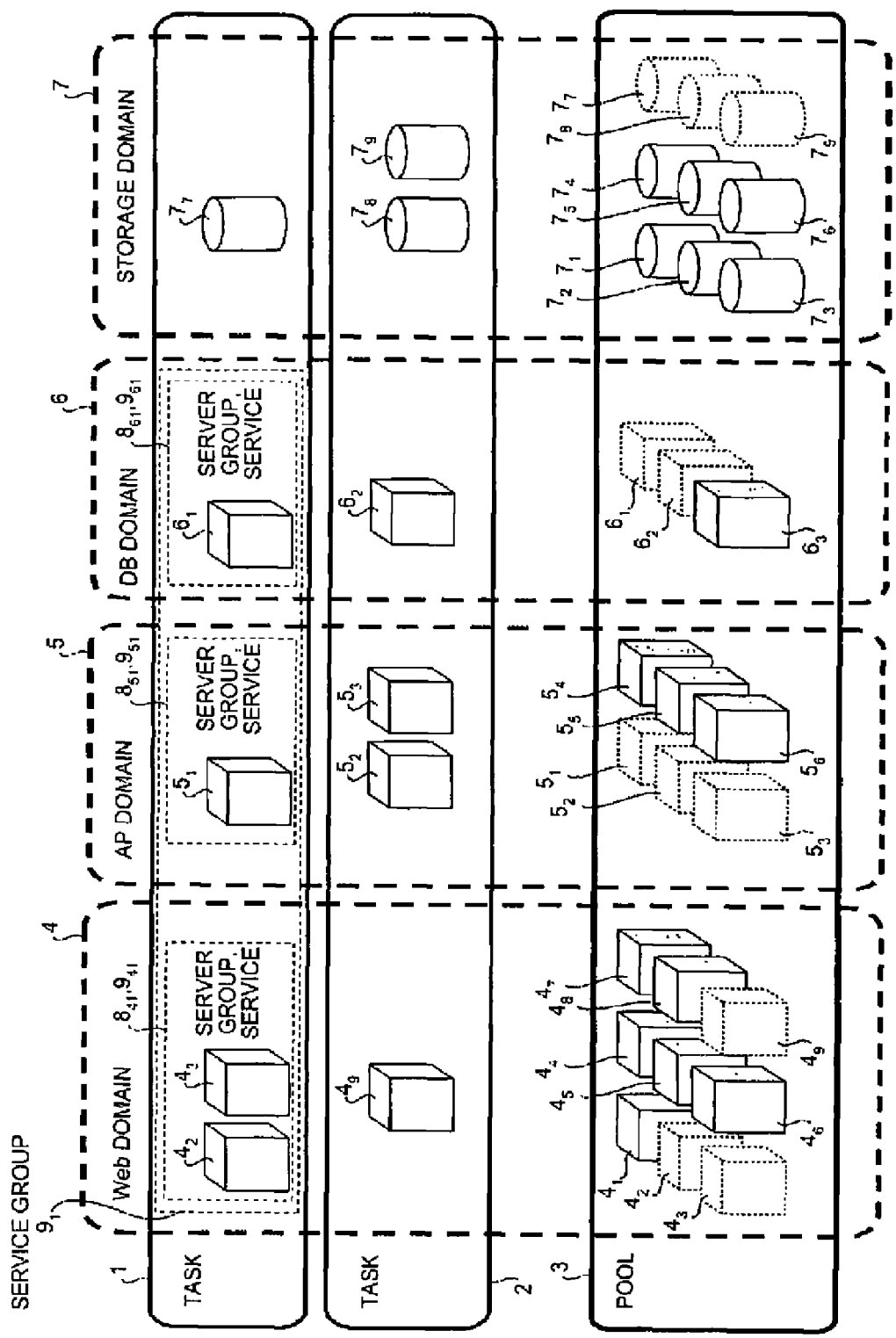
FIG. 1 is a schematic for explaining a concept of a domain and a service group in an operation management program according to an embodiment of the present invention.
Figure 2:
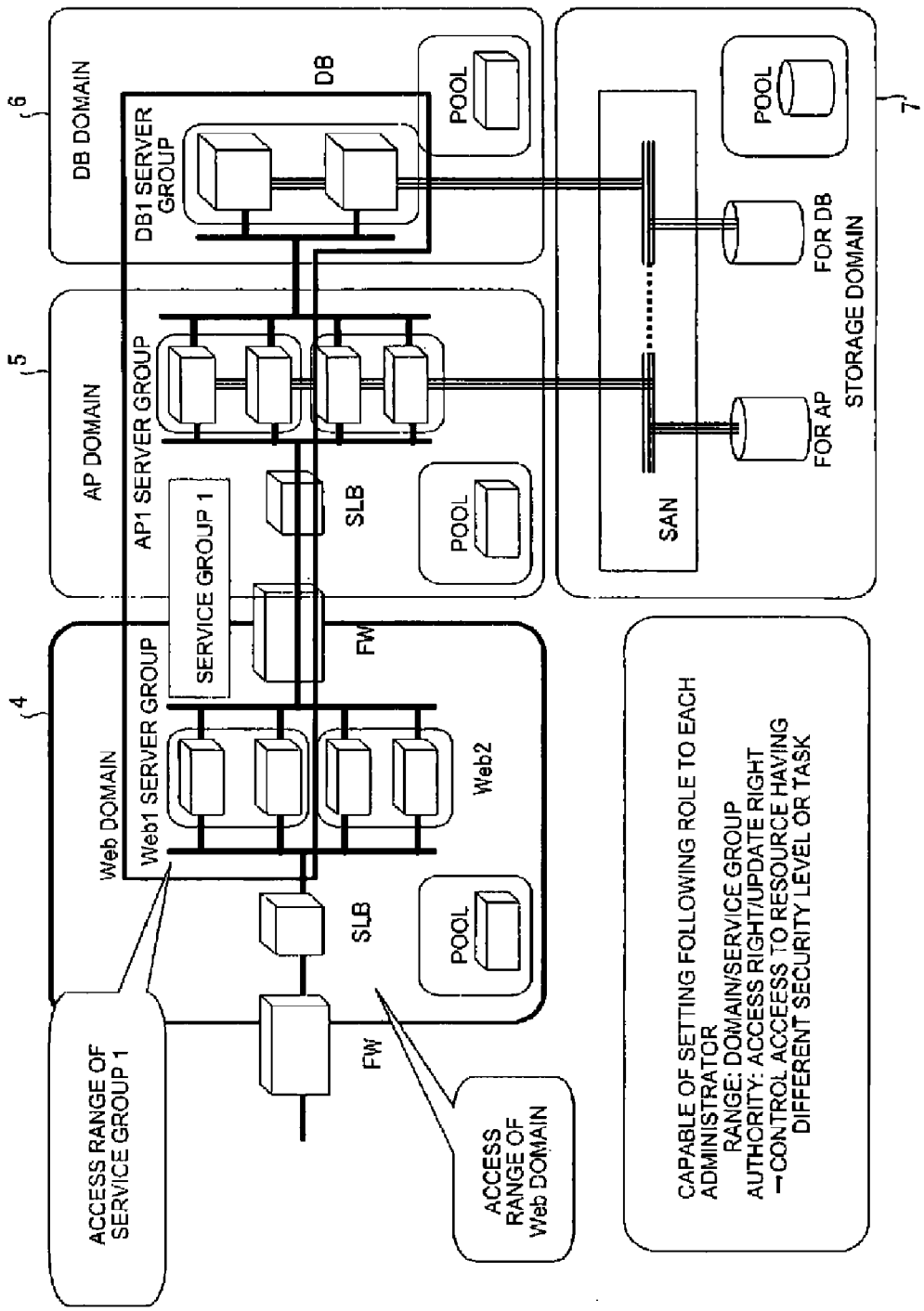
FIG. 2 is a schematic for explaining a concept of an administrator role based on the domain and the service group.

FIG. 1 is a schematic for explaining a concept of a domain and a service group in the operation management program according to an embodiment of the present invention. FIG. 2 is a schematic for explaining a concept of an administrator role based on the domain and the service group.

In FIG. 1, a case is depicted in which information processing apparatuses such as web servers $4_1$ to $4_9$, AP (application) servers $5_1$ to $5_6$, DB (database) servers $6_1$ to $6_3$, and storages $7_1$ to $7_9$ are used for each of tasks 1 and 2.

The web servers $4_1$ to $4_9$ are servers that provide contents to be browsed by web browsers to client terminals via the Internet. The AP servers $5_1$ to $5_6$ are servers that take over execution of information processes requested by the web servers $4_1$ to $4_9$ that have received an information processing request from a user.

The DB servers $6_1$ to $6_3$ are servers that manage accesses to database upon receiving requests for accessing the database from the AP servers $5_1$ to $5_6$. The storages $7_1$ to $7_9$ are storage devices to be connected via a SAN to the web servers $4_1$ to $4_9$, the AP servers $5_1$ to $5_6$, and the DB servers $6_1$ to $6_3$.

With operation management according to the present invention, a resource group that contains servers or storages having a uniform physical wire connection to other devices is managed as a domain in a LAN (local area network) or a SAN (storage area network).

For example, in the case shown in FIG. 1, server groups used for the tasks 1 and 2 are managed as a web domain 4, an AP domain 5, and a DB domain 6, while a storage group used for the tasks 1 and 2 is managed as a storage domain 7.

In this case, the web servers $4_1$ to $4_9$ that belong to the web domain 4 have uniform connections to other devices, the AP servers $5_1$ to $5_6$ that belong to the AP domain 5 have uniform connections to other devices, the DB servers $6_1$ to $6_3$ that belong to the DB domain 6 have uniform connections to other devices, and the storages $7_1$ to $7_9$ that belong to the storage domain 7 have uniform connections to other devices.

On the other hand, devices in different domains have different connections from one another, and have different security levels from one another. For example, because the web domain 4 is a domain close to an external network, the security level is generally lower than that of the AP domain 5.

With the operation management, unused ones of the web servers $4_1$ to $4_9$, the AP servers $5_1$ to $5_6$, the DB servers $6_1$ to $6_3$, and the storages $7_1$ to $7_9$ are registered to a pool 3 for each domain. The web servers $4_1$ to $4_9$, the AP servers $5_1$ to $5_6$, the DB servers $6_1$ to $6_3$, and the storages $7_1$ to $7_9$ are assigned to each of the tasks 1 and 2 as appropriate.

For example, in the example of FIG. 1, the web servers $4_2$ and $4_3$, the AP server $5_1$, the DB server $6_1$, and the storage $7_7$ are assigned to the task 1, while the web server $4_9$, the AP servers $5_2$ and $5_3$, the DB server $6_2$, and the storages $7_8$ and $7_9$ are assigned to the task 2.

Servers assigned to a specific task in each of the domains constitute a server group in each of the domains. Each of server groups corresponds to a service provided by each of the domains for performing the specific task. By grouping services for the same task from each of the domains, a service group is created. As a result, servers in the server groups that respectively provide services belong to the service group.

For example, the web servers $4_2$ and $4_3$ assigned to the task 1 constitute a server group $8_{41}$ in the web domain 4, and the server group $8_{41}$ provides a service $9_{41}$. The AP server $5_1$ assigned to the task 1 constitutes a server group $8_{51}$ in the AP domain 5, and the server group $8_{51}$ provides a service $9_{51}$. The DB server $6_1$ assigned to the task 1 constitutes a server group $8_{61}$ in the DB domain 6, and the server group $8_{61}$ provides a service $9_{61}$. The services $9_{41}$, $9_{51}$, and $9_{61}$ constitute a service group $9_1$. As a result, the web servers $4_2$ and $4_3$, the AP server $5_1$, and the DB server $6_1$ belong to the service group $9_1$.

In this manner, as shown in FIG. 2, the operation management program according to the embodiment enables a setting of access right or access and update right as administrative right for each of the domains such as the web domain 4, the AP domain 5, and the DB domain 6.

Furthermore, the operation management program according to the embodiment enables a setting of access right or access update right as administrative right for each of the service groups. For example, the administrative right can be set on a "service group 1" that is a service group containing services provided by a server group "web 1" in the web domain, a server group "AP 1" in the AP domain, and a server group "DB 1" in the DB domain.

In this manner, with an administrator role according to the embodiment, administrative right can be set on a domain or a service group as a target range for each administrator, which facilitates a setting of administrative right from a viewpoint of security level of resources and services.

A functional configuration of an operation management system according to the embodiment is explained next. FIG. 3 is a diagram of a functional configuration of the operation management system according to the embodiment.

As shown in FIG. 3, in the operation management system, an operation management client 10 is connected to a site management server 20 via an FW (firewall) 30 over a network. The site management server 20 is connected over the network to domain management servers 50 and 60 via an FW 40.

Furthermore, the site management server 20 is connected over the network to a router 80 that belongs to an edge domain 180 via the FW 40. The site management server 20 is also connected over the network to storages 160a to 160c that belong to a storage domain 220, and to a storage 160d that is pooled via the FW 40.

The domain management server 50 is connected over the network to an SLB (server load balancer) 100 and to servers 110a to 110c that belong to a web domain 190.

Furthermore, the domain management server 60 is connected over the network to an FW 120, an SLB 130, servers 140a to 140c that belong to an AP domain 200, servers 150a to 150c that belong to a DB domain 210.

The storages 160a to 160c that belong to the storage domain 220, and the storage 160d that is pooled are also connected via a SAN 170 to the servers 110a to 110c that belong to the web domain 190, the servers 140a to 140c that belong to the AP domain 200, and the servers 150a to 150c that belong to the DB domain 210.

In this case, the operation management client 10 is a client terminal that receives various requests related to resource management from an administrator and transmits information to the site management server 20, and that receives various output results from the site management server 20 and displays the output results on a monitor or the like.

The site management server 20 is a server that performs operation management of the entire information processing system in cooperation with the domain management servers 50 and 60. The site management server 20 includes a system resource manager 21, a server RM (resource manager) 22, a software RM 23, a network RM 24, a storage RM 25, a system resource DB 26, and an AP-management control unit 27.

The system resource manager 21 is a managing unit that receives various setting information related to the operation management from the operation management client 10, and operates resources in cooperation with the server RM 22, the software RM 23, the network RM 24, and the storage RM 25. In addition, the system resource manager 21 performs data reception and data transmission between the domain management servers 50 and 60.

When an administrator sends a resource-operation request using the operation management client 10, the system resource manager 21 determines whether to accept the resource-operation request based on whether the administrator has administrative right on a corresponding resource. Details of determination on acceptance or rejection of the resource-operation request are explained later.

The server RM 22 is a managing unit that performs a boot and a shutdown of each of the servers 110a to 110c, 140a to 140c, and 150a to 150c, a collection of information about hardware, a setting, and the like. The server RM 22 performs the above processes in cooperation with a server sub RM 52 of the domain management server 50, and a server RM agent 112a of the server 110a.

The software RM 23 is a managing unit that performs software installation, setting, collection of information about the software, and the like for each of the servers 110a to 110c, 140a to 140c, and 150a to 150c. The software RM 23 performs the above processes in cooperation with a software sub RM 53 of the domain management server 50, and a software RM agent 113a of the server 110a.

The network RM 24 is a managing unit that performs information collection, setting, and the like related to the network. The network RM 24 performs the above processes in cooperation with a network sub RM 54 of the domain management server 50, and a network RM agent 114a of the server 110a.

The storage RM 25 is a managing unit that performs information collection, setting, and the like related to the storages 160a to 160c that belong to the storage domain 220, and relate to the storage 160d that is pooled. The storage RM 25 manages the storages 160a to 160c and the storage 160d pooled without involving the domain management servers 50 and 60.

The system resource DB 26 is a database that contains various resource information managed by the system resource manager 21, the server RM 22, the software RM 23, the network RM 24, and the storage RM 25. Details of stored data are explained later.

The AP-management control unit 27 is a processing unit that controls and manages an AP managing unit 116a. More specifically, the AP-management control unit 27 sends a request for executing process related to an application such as installation and setting to the AP managing unit 116a. Functions of the AP-management control unit 27 are realized by executing middleware installed on the site management server 20.

The domain management servers 50 and 60 are servers that manage resources in a domain or a plurality of domains. The domain management server 50 includes a system resource domain manager 51, the server sub RM 52, the software sub RM 53, the network sub RM 54, and a domain resource DB 55.

The domain management server 60 includes the same function units as the function units of the domain management server 50, and therefore, the function units of the domain management server 60 are not shown in FIG. 3 and explanations thereof are omitted.

The system resource domain manager 51 is a managing unit that performs information collection, setting process, and the like related to resources that belong to each of the domains in cooperation with the server sub RM 52, the software sub RM 53, and the network sub RM 54.

Furthermore, the system resource domain manager 51 performs data reception and data transmission to and from networking equipment such as the site management server 20, an FW 90, and the SLB 100, as well as to and from the servers 110a to 110c to be managed.

The server sub RM 52 is a managing unit that performs boot, shutdown, collection of information about hardware, setting, and the like in cooperation with the server RM 22 and the server RM agent 112a.

The software sub RM 53 is a managing unit that performs software installation, setting, collection of information about software, and the like for each of the servers 110a to 110c in cooperation with the software RM 23 and the software RM agent 113a.

The network sub RM 54 is a managing unit that performs information collection, setting, and the like related to a network in cooperation with the network RM 24 and the network RM agent 114a.

The domain resource DB 55 is a database that stores therein information acquired from the servers 110a to 110c and the system resource DB 26, when the server sub RM 52, the software sub RM 53, or the network sub RM 54 collects various information or specifies settings related to the servers 110a to 110c to be managed. In addition, the domain resource DB 55 stores therein a virtual OS (operating system) used for network boot of the servers 110a to 110c.

The router 80 is networking equipment that performs routing of data packets in data communication via the Internet 70. The FWs 30, 40, 90, and 120 are networking equipments that prevent unauthorized access to each of the servers 110a to 110c, 140a to 140c, and 150a to 150c.

The SLBs 100 and 130 are load balancers that distribute and transfer information-processing requests for the servers 110a to 110c or 140a to 140c to a plurality of the servers 110a to 110c or 140a to 140c. Although switches are also connected in upstream sides and downstream sides of the SLBs 100 and 130, the switches are not shown in FIG. 3.

The servers 110a to 110c, 140a to 140c, and 150a to 150c are servers that perform various information processes. The server 110a includes a resource manager agent 111a, the server RM agent 112a, the software RM agent 113a, the network RM agent 114a, a storage RM agent 115a, and the AP managing unit 116a.

The servers 110b, 140a, 140b, 150a, and 150b include the same function units as those of the server 110a. Therefore, the function units of the servers 110b, 140a, 140b, 150a, and 150b are not shown in FIG. 3, and explanations thereof are omitted.

The servers 110c, 140c, and 150c are servers that are pooled, and do not include each of the resource manager agent 111a, the server RM agent 112a, the software RM agent 113a, the network RM agent 114a, the storage RM agent 115a, and the AP managing unit 116a.

When the server 110c, 140c, or 150c is set as a server available for tasks, a computer program that realizes each of the function units is installed on the server 110c, 140c, or 150c and is executed to realize each of the function units.

The resource manager agent 111a is an agent that receives a request for executing process such as setting and information collection from the domain management server 50 of the system resource domain manager 51 for the server 110a, and performs processes in cooperation with the server RM agent 112a, the software RM agent 113a, the network RM agent 114a, and the storage RM agent 115a.

The server RM agent 112a is an agent that performs a boot and a shutdown of the server 110a, a collection of information about hardware, a setting, and the like. The software RM agent 113a is an agent that performs software installation, setting, and collection of information about software for the server 110a.

The network RM agent 114a is an agent that performs information collection, setting, and the like related to a network connected to the server 110a. The storage RM agent 115a is an agent that performs information collection, setting, and the like related to a storage connected to the server 110a.

The storages 160a to 160c are storages used by the servers 110a to 110c that belong to the web domain 190, the servers 140a to 140c that belong to the AP domain 200, and the servers 150a to 150c that belong to the DB domain 210. The storage 160d is a storage that is pooled. The storages 160a to 160d are constituted of RAID devices.

A VLAN (virtual local area network) is set as a network that connects between the servers 110a to 110c that belong to the web domain 190, the servers 140a to 140c that belong to the AP domain 200, and the servers 150a to 150a that belong to the DB domain 210.

FIG. 4 is a flowchart of a processing procedure for assigning a server to a task. In the following explanation, it is assumed that an operation management program is previously installed on the site management server 20, which causes the site management server 20 to perform functions of the system resource manager 21, the server RM 22, the software RM 23, the network RM 24, the storage RM 25, the system resource DB 26, and the AP-management control unit 27.

A program is previously installed on the domain management servers 50 and 60, which causes the domain management servers 50 and 60 to perform functions of the system resource domain manager 51, the server sub RM 52, the software sub RM 53, and the network sub RM 54.

Furthermore, programs are previously installed on each of the servers 110a, 110b, 140a, 140b, 150a, and 150b, which cause the servers 110a, 110b, 140a, 140b, 150a, and 150b to perform functions of the resource manager agent 111a, the server RM agent 112a, the software RM agent 113a, the network RM agent 114a, the storage RM agent 115a, and the AP managing unit 116a.

As shown in FIG. 4, the system resource manager 21 of the site management server 20 performs a registering process of an operation management server and a management-LAN (step S101). The operation management server and the management-LAN are the site management server 20, the domain management server 50, and the LAN used for managing management target resources such as the servers 110a to 110c, 140a to 140c, and 150a to 150c, and the SAN 170.

FIG. 5 is a diagram of an example of site data 300 registered as information on an operation management server. The site data 300 contains information on site name, site management server name, and domain management server name.

The site name is information that identifies a site that includes a resource to be managed. The site management server name is information that identifies the site management server 20 set to manage the site. The domain management server name is information that identifies the domain management servers 50 and 60 set to manage domains set in the site.

FIG. 6 is a diagram of an example of domain management server data 310 registered as information on the domain management servers 50 and 60. The domain management server data 310 contains information on domain management server name and management subnet name.

The domain management server name is the same information as the domain management server name explained in connection with FIG. 5. The management subnet name is information that identifies a subnet (a management subnet) in which a resource is to be managed by the domain management servers.

FIG. 7 is a diagram of an example of management subnet data 320 registered as information on subnets to be managed. The management subnet data 320 contains information on management subnet name, network address, netmask, and default gateway.

The management subnet name is the same information as the management subnet name explained in connection with FIG. 6. The network address is a network address for identifying the management subnet. The netmask is a netmask that defines which bits in an IP address are to be used as the network address. The default gateway is information on an IP address that identifies a default gateway used for transmitting data to outside the management subnet.

At step S101, the system resource manager 21 receives information on site, site management server, and domain management server, which are set by an administrator by operating the operation management client 10, and registers received information to the site data 300 shown in FIG. 5.

The system resource manager 21 receives information on domain management server and management subnet, which are set by the administrator by operating the operation management client 10, and registers received information to the domain management server data 310 shown in FIG. 6.

Thereafter, the system resource manager 21 registers information on network address, netmask, and default gateway, which correspond to the management subnet explained in FIG. 6, to the management subnet data 320 shown in FIG. 7.

In addition, the system resource manager 21 notifies the AP-management control unit 27 of occurrence of an event such as addition to or deletion from the servers 110a to 110c, 140a to 140c, and 150a to 150c, and sets commands for executing various processes in cooperation with the AP-management control unit 27.

FIG. 8 is a diagram of an example of middleware cooperation IF data 330 including commands for performing various processes in cooperation with middleware. The middleware cooperation IF data 330 contains information on middleware name, target event, timing, location, and execution command.

The middleware names is information on middleware with which the system resource manager 21 performs processes. The target event is information on events that the system resource manager 21 requests the middleware to execute. The timing is information on timing at which the system resource manager 21 transmits a request for executing processes to the middleware (before or after a process for the target event)

The location is information on locations where the middleware executes a command (a "manager" or an "agent"). The "manager" indicates that the command is executed on the site management server 20, while the "agent" indicates that the command is executed on the servers 110a to 110c, 140a to 140c, and 150a to 150c to be managed. The execution command is information on commands that notifies the middleware of occurrence of various events.

Referring back to FIG. 4, the system resource manager 21 performs a domain creating process and a linking process between created domains (step S102). The processes performed at step S102 is explained in detail below.

FIG. 9 is a diagram of an example of server domain data 340 stored as information on server domains to which the servers 110a to 110c, 140a to 140c, and 150a to 150c belong.

The server domain data 340 contains information on server domain name, server architecture name, and management subnet name. The server domain name is information that identifies a domain to which the servers 110a to 110c, 140a to 140c, and 150a to 150c belong.

The server architecture name is information that identifies CPU (central processing unit) architecture of the servers 110a to 110c, 140a to 140c, and 150a to 150c that belong to each of the server domains. The management subnet name is the same information as the management subnet name shown in FIG. 6.

At step S102, the system resource manager 21 receives information on settings of the server domains and the server architectures specified by the administrator by operating the operation management client 10, and registers received information to the server domain data 340. The server domains are set in units of the management subnet set at step S101.

Furthermore, at step S102, the system resource manager 21 sets server groups that belong to each of the server domains, and sets pool groups shared between the server groups and pool groups exclusive to specific server groups.

In this case, the server groups is created by classifying servers in the same server domain into one or more groups. The pool group is a pool of the servers assigned to each of the server groups.

FIG. 10 is a diagram of an example of pool group data 350 stored as information on pool groups. The pool group data 350 contains information on pool group name, type, and server domain name.

The pool group name is information that identifies a pool of each of the above described servers. The type is information that indicates whether the pool group is to be shared by a plurality of the server groups or to be exclusively permitted for usage by specific server groups. The server domain name is the same information as the server domain name explained in connection with FIG. 9.

The system resource manager 21 assigns the pool group to each of the server domains. When the server domain includes a plurality of the sever groups, the system resource manager 21 assigns the pool group exclusive to the server groups.

Thereafter, the system resource manager 21 receives information on storage domains set by the administrator by operating the operation management client 10, and registers received information to the system resource DB 26 as storage domain data 360 explained below.

FIG. 11 is a diagram of an example of the storage domain data 360 stored as information on storage domains. The storage domain data 360 contains information on storage domain name and redundancy of path. The storage domain name is information that identifies a set storage domain. The redundancy of path is information on redundancy of a data communication path on the SAN.

Referring back to FIG. 4, the system resource manager 21 performs a registering process of server resources and storage resources to be managed (step S103). The process performed at step S103 is explained in detail below.

When the administrator selects a management subnet to which the server is registered by operating the operation management client 10, the system resource manager 21 receives information on the management subnet selected by the administrator.

The system resource manager 21 also receives information on servers to be managed, which is input by the administrator by operating the operation management client 10, from the operation management client 10, and stores received information in the domain resource DB 55 of the domain management server 50 as network boot server data 690 explained below. Subsequently, the servers registered are network booted, and registered as the server resources after various information on the severs are acquired.

FIG. 12 is a diagram of an example of the network boot server data 690 stored as information on network boot servers. The network boot server data 690 contains information on MAC address, IP address, and host name.

The MAC address is information on a MAC address of the server. The IP address is information on an IP addresses assigned to the server. The host name is information on a host name assigned to the server.

In this case, upon receiving information on MAC address of the network boot server input by the administrator, the system resource manager 21 automatically assigns the IP address and the host name to the server corresponding to the MAC address.

The system resource manager 21 performs network boot on the server to which the IP address and the host name are assigned, by using the virtual OS stored in the domain resource DB 55 of the domain management server 50, in cooperation with the system resource domain manager 51 of the domain management server 50.

The server sub RN 52, the resource manager agent 111a, and the server RM agent 112a work together to collect information on hardware of the server and transmit collected information to the system resource domain manager 51.

Thereafter, the system resource manager 21 acquires information on hardware of the server from the system resource domain manager 51, and stores acquired information in the system resource DB 26 as management target server data 700 explained below.

When the administrator inputs, by operating the operation management client 10, setting information indicating whether SAN boot is to be performed, in which a server is booted by the storages 160a to 160d connected via the SAN 170, the system resource manager 21 receives the setting information and registers the setting information to the management target server data 700.

FIG. 13 is a diagram of an example of the management target server data 700 stored as information on servers to be managed. The management target server data 700 contains information on server name, IP address, MAC address, server architecture name, model name, SAN boot, and status.

The server name is a name that identifies a server to be managed. The IP address is an IP address that is assigned to the server. The MAC address is a MAC address of the server. The server architecture name is information that identifies CPU architecture of the server. The model name is information that indicates the model of the server. The SAN boot is setting information as to whether the storages 160a to 160b connected to the server via the SAN 170 perform SAN boot to boot the server. The status is information that indicates whether an error is occurring in the server.

Although it is assumed herein that an administrator specifies the MAC address of a network boot server, the server can be automatically selected. Specifically, when the administrator sets information that specifies the number of servers to be automatically selected by operating the operation management client 10, the system resource manager 21 receives the information from the operation management client 10.

The system resource manager 21 selects servers of specified number, and registers information on an IP address and a host name of the servers to the network boot server data 690 shown in FIG. 12.

In cooperation with the system resource domain manager 51 in the domain management server 50, the system resource manager 21 performs network boot on the servers assigned the IP address and the host name using the virtual OS stored in the domain resource DB 55 in the domain management server 50.

With the cooperation of the server sub RM 52, the resource manager agent 111a, and the server RM agent 112a, information on the MAC address, server architecture, model, and status of each server is collected and transmitted to the system resource domain manager 51.

After that, the system resource manager 21 obtains the information on the MAC address, server architecture, model, and status of each server from the system resource domain manager 51. The system resource manager 21 stores the information in the system resource DB 26 as the management target server data 700.

Subsequently, the system resource manager 21 registers a storage device to be managed. Examples of the storage device include FC (Fiber Channel) switch and RAID device.

Specifically, when an administrator inputs information on the IP address of a storage to be registered as a management target with respect to each management subnet shown in FIG. 7, the system resource manager 21 receives the information from the operation management client 10. The system resource manager 21 stores information on a storage device corresponding to the IP address in the system resource DB 26, thereby registering the storage device.

The system resource manager 21 adds the servers registered to the management target server data 700 shown in FIG. 13 to a server domain. Specifically, when the administrator specifies a server and a server domain where the server is to be added by operating the operation management client 10, the system resource manager 21 receives the information on the server and the server domain from the operation management client 10.

Referring to the management target server data 700 shown in FIG. 13, the system resource manager 21 checks whether the server architecture of the server matches server architecture registered to the server domain data 340 shown in FIG. 9.

The system resource manager 21 retrieves the management target server data 700 shown in FIG. 13, and checks that SAN boot is to be performed on the server.

The system resource manager 21 also checks the connection state of a network of the server to be added to the server domain. When there is no defect in the connection between the server and a switch, the system resource manager 21 stores, as provisioning configuration data 710 described below, information on the server in the system resource DB 26 in association with a pool group previously described in connection with FIG. 10.

FIG. 14 is a diagram of an example of the provisioning configuration data 710 stored as information on groups to which servers belong. The provisioning configuration data 710 contains information on server name, pool group name, server group name, storage sub-group name, and accessibility.

The saver name is the same information as described in connection with FIG. 13. The pool group name is the same information as described in connection with FIG. 10. The server group name is information that identifies a server group when servers on the same server domain are classified into one or more groups. At this point, information on the server group name has not been registered.

The storage sub-group name is information that identifies a storage group when storages on the same storage domain are classified into one or more groups and assigned to each server in the server group. At this point, information on the storage sub-group name has not been registered. The accessibility is information that indicates whether a server is allowed to access storages. At this point, information on the accessibility has not been registered.

After registering the saver name and the pool group name to the provisioning configuration data 710, the system resource manager 21 registers the storage device, which has been previously registered, in a storage domain.

The system resource manager 21 then creates a server group (step S104). The process performed at step S104 is explained in detail below.

The system resource manager 21 receives information on a storage template that an administrator has specified by operating the operation management client 10. The system resource manager 21 registers the information in the system resource DB 26 as storage template data 800 described below. The term "storage template" as used herein refers to setting information on a configuration of a storage for a server group created later.

FIG. 15 is a diagram of an example of the storage template data 800 stored as information on storage templates. The storage template data 800 contains information on storage template name, disk type, disk name, reliability need, load level, disk capacity, and boot disk.

The storage template name is information that identifies a storage template that has been specified. The disk type is information that indicates the type of usage of a disk belonging to a storage template.

For example, "root" indicates that the disk is used to store system data, "local" indicates that the disk is used to store individual data on a server, and "shared" indicates that the disk is used to store data to be shared among servers.

The disk name is a name that is assigned to each disk to identify the disk. The reliability need is information on required reliability of the disk. The load level is information on the level of load on the disk. The disk capacity is the storage capacity of the disk. The boot disk is information that indicates whether the disk is used to boot a system.

The system resource manager 21 receives information on a server group that an administrator has set by operating the operation management client 10. The system resource manager 21 registers the information in the system resource DB 26 as server group data 810 described below.

FIG. 16 is a diagram of an example of the server group data 810 stored as information on server groups. The server group data 810 contains information on server group name, server domain name, software distribution image name, storage template name, SAN boot, and auto recovery.

The server group name is information that identifies a server group when servers on the same server domain are classified into one or more groups. The server domain name is information that identifies a server domain to which the server group belongs. The software distribution image name is information that identifies a software image file to be distributed to servers in the server group.

The version is information on a version of the software image file to be distributed. The storage template name is the same information as described in connection with FIG. 15. The SAN boot is information that indicates whether to perform SAN boot on the servers in the server group. The auto recovery is information that indicates whether a server is automatically added when a failure occurs in one of servers in a scale-out configuration that operate in cooperation with each other.

The system resource manager 21 registers information on a storage group corresponding to the server group in the system resource DB 26. The storage group is created by classifying storages on the same storage domain into one or more groups.

The system resource manager 21 transmits a command to the AP managing unit 116a to notify the AP managing unit 116a of the addition of the server group. Specifically, the system resource manager 21 transmits a command "issvgrp add" as shown in FIG. 8 to the AP managing unit 116a. The system resource manager 21 also stores information on a network group in the system resource. DB 26.

The system resource manager 21 adds the first server to the server group. The system resource manager 21 creates a software image of software installed on the server (step S105).

At this point, the system resource manager 21 registers a storage sub-group associated with the server group to which each server belongs, and sets access right of the server to a storage group. Specifically, the system resource manager 21 adds information on server group name, storage sub-group name, and accessibility to the provisioning configuration data 710.

FIG. 17 is a diagram of an example of provisioning configuration data 960 in which storage sub-groups are specified. The provisioning configuration data 960 is resultant after the information on server group name, storage sub-group name, and accessibility is added to the provisioning configuration data 710 shown in FIG. 14.

The system resource manager 21 adds the second server to the server group using the software image created at the time of adding the first server (step S106), and registers the server in the server group.

The system resource manager 21 receives information on a service and a service group that an administrator has set by operating the operation management client 10. The system resource manager 21 registers the information in the system resource DB 26 as service data 1181 and service group data 1182 described below (step S107).

Figure 18:
FIG. 18 is a diagram of an example of service data.

FIG. 18 is a diagram of an example of the service data 1181 stored as information on services. The service data 1181 contains information on service name, server group name, and status information.

The service name is information that identifies a service. The server group name is information that identifies a server group that provides the service. The status information is information that indicates the status of the service provided by a server in the server group. The status information indicates "normal" when the service is provided without error, and indicates "abnormal" when an error occurs in the service.

Figure 19:
FIG. 19 is a diagram of an example of service group data.

FIG. 19 is a diagram of an example of the service group data 1182 stored as information on service groups. The service group data 1182 contains information on service group name and service name.

The service group name is information that identifies a service group. The service name is information on services that constitute the service group.

The system resource manager 21 receives information on an administrator and an administrator role that the administrator has set by operating the operation management client 10. The system resource manager 21 registers the information in the system resource DB 26 as administrator data 1183 and administrator role data 1184 described below (step S108).

FIG. 20 is a diagram of an example of the administrator data 1183 stored as information on administrators. The administrator data 1183 contains information on administrator name and password. The administrator name is information that identifies an administrator. The password is authentication information that the administrator uses to utilize the operation management program.

FIG. 21 is a diagram of an example of the administrator role data 1184 stored as information on administrator role. The administrator role data 1184 contains information on service groups and domains on which each administrator has administrative right.

In FIG. 21, "rw" indicates that an administrator has access (read) and update (write) right on resources belonging to a service group or a domain, while "ro" indicates that the administrator has access (read) right only to resources belonging to a service group or a domain. For example, an administrator "dmz_mgr" has access and update right on resources belonging to "Web_domain", "AP_domain", and "Web_AP_DISK_domain".

Incidentally, "site management" indicates that an administrator has administrative right on all resources of a site; administrators "root" and "monitor" have administrative right on all resources of a site.

Figure 22:
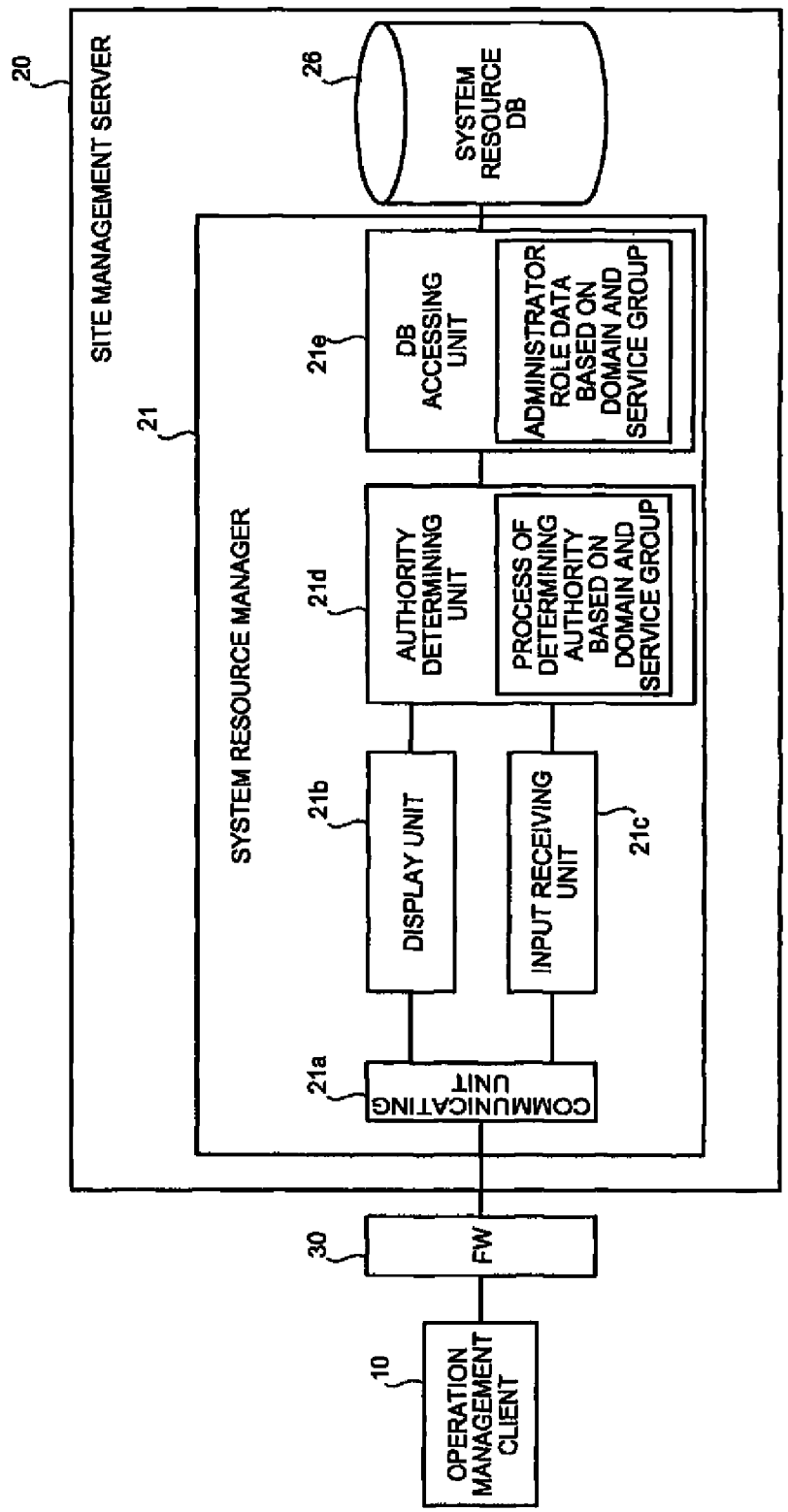
FIG. 22 is a functional block diagram of a configuration of a system resource manager shown in FIG. 3.

A configuration of the system resource manager 21 shown in FIG. 3 is explained below. FIG. 22 is a functional block diagram of a configuration of the system resource manager 21 shown in FIG. 3.

As shown in FIG. 22, the system resource manager 21 includes a communicating unit 21a, a display unit 21b, an input receiving unit 21c, an authority determining unit 21d, and a DB accessing unit 21e.

The communicating unit 21a communicates with the operation management client 10 and the like via a network. For example, the communicating unit 21a receives a resource-operation request from the operation management client 10, and sends it to the input receiving unit 21c. The communicating unit 21a also receives display data from the display unit 21b, and transmits it to the operation management client 10.

The display unit 21b creates display data to be displayed on the operation management client 10. The display data is transmitted through the communicating unit 21a. The display unit 21b creates, for example, display data of a login screen or a resource-display screen to be transmitted to the operation management client 10.

The input receiving unit 21c receives data and commands input through the operation management client 10. For example, the input receiving unit 21c receives login data and a resource-operation request, and sends them to the authority determining unit 21d.

The authority determining unit 21d receives a resource-operation request from the input receiving unit 21c. Based on resource information and administrator role information stored in the system resource DB 26, the authority determining unit 21d determines whether to accept the resource-operation request.

Specifically, the authority determining unit 21d checks whether an administrator who has requested resource operation has administrative right on a domain or a service group that includes a resource subjected to the resource operation. Based on this, the authority determining unit 21d determines whether to accept the resource-operation request.

Upon determining to accept the resource-operation request, the authority determining unit 21d operates the resource in cooperation with the server RM 22, the software RM 23, the network RM 24, and the storage RM 25. Thereafter, the authority determining unit 21d updates system-resource information stored in the system resource DB 26.

Because the authority determining unit 21d determines whether to accept a resource-operation request based on whether an administrator has administrative right on a domain or a service group that includes a resource subjected to resource operation, administrative right can be established with respect to units of domain or service group.

Besides, the authority determining unit 21d receives login data from the input receiving unit 21c. Based on administrator information stored in the system resource DB 26, the authority determining unit 21d authenticates a login user. When the login user is authenticated as an administrator, the authority determining unit 21d retrieves resource information of a domain or a service group on which the administrator has administrative right from the system resource DB 26, and sends the resource information to the display unit 21b.

The DB accessing unit 21e accesses the system resource DB 26. Specifically, the DB accessing unit 21e reads information to be used by the authority determining unit 21d, such as the service data 1181, the service group data 1182, the administrator data 1183, the administrator role data 1184, and resource information, from the system resource DB 26. When the authority determining unit 21d accepts a resource-operation request, the DB accessing unit 21e updates the system resource DB 26 according to an instruction from the authority determining unit 21d.

Figure 23:
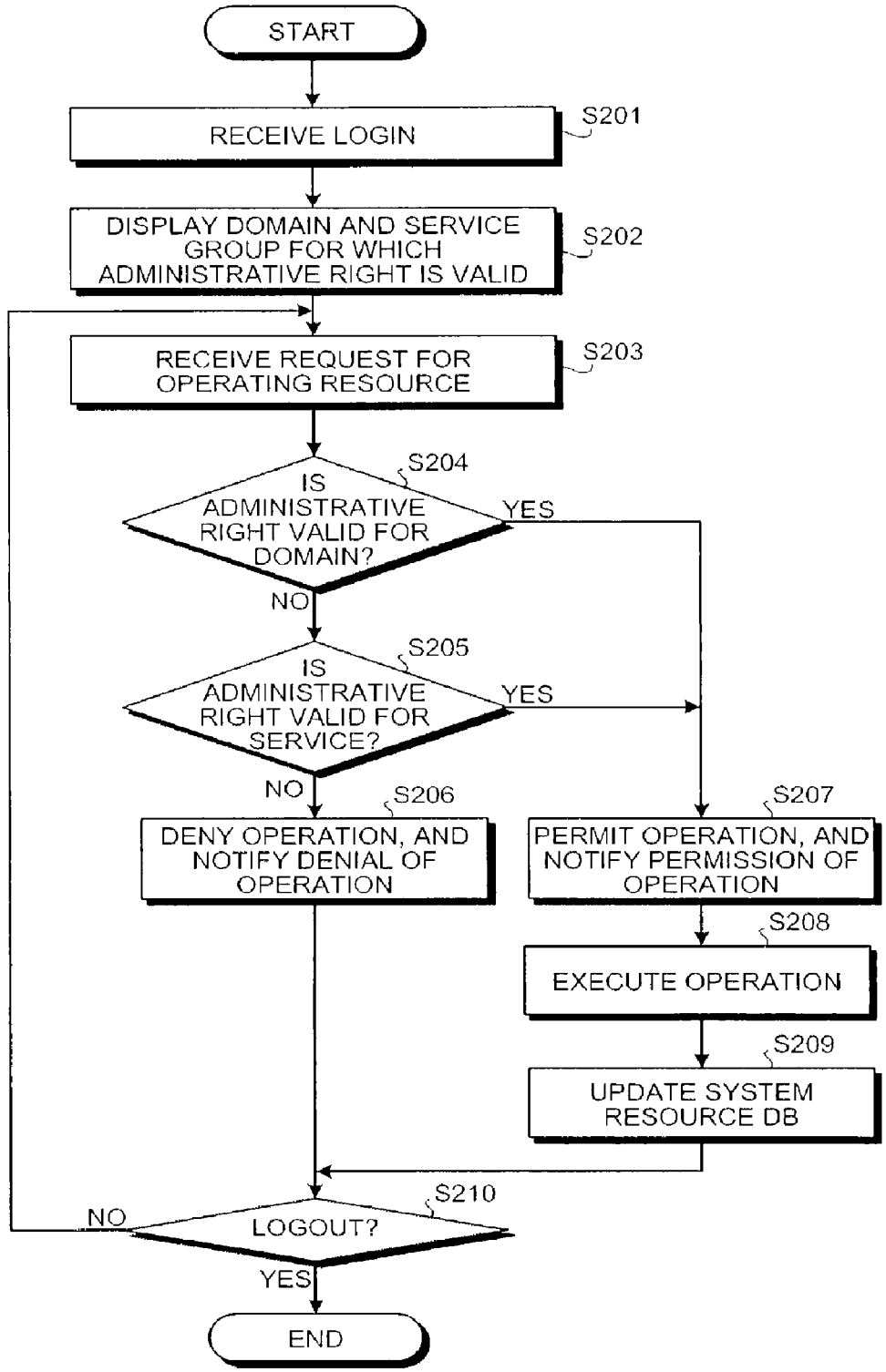
FIG. 23 is a flowchart of a processing procedure of resource operation performed by the system resource manager in response to a resource-operation request from an administrator.

A processing procedure is explained below as to how the system resource manager 21 performs resource operation in response to a resource-operation request from an administrator. FIG. 23 is a flowchart of a processing procedure of resource operation performed by the system resource manager 21 in response to a resource-operation request from an administrator.

As shown in FIG. 23, in the system resource manager 21, when the input receiving unit 21c receives a login request from an administrator (step S201), the authority determining unit 21d authenticates the administrator. If the administrator is authenticated, the authority determining unit 21d refers to the administrator role data 1184 shown in FIG. 21 and the like, and obtains information on a domain and a service group on which the login administrator has administrative right and resources belonging to the domain and the service group. Through the display unit 21b, the information is displayed on the operation management client 10 (step S202).

The input receiving unit 21c receives a request for operating a resource from the operation management client 10 (step S203). Referring to the system resource DB 26, the authority determining unit 21d determines whether the administrator has administrative right on a domain that includes a resource subjected to the operation (step S204).

When the administrator does not have administrative right on the domain that includes the resource subjected to the operation, the authority determining unit 21d determines whether the administrator has administrative right on a service group that includes the resource referring to the system resource DB 26 (step S205). When the administrator does not have administrative right on the service group, the authority determining unit 21d denies the operation. Through the display unit 21b, notification of denial of the operation is displayed on the operation management client 10 (step S206).

On the other hand, when the administrator has administrative right on the service group that includes the resource subjected to the operation or on the domain that includes the resource subjected to the operation, the authority determining unit 21d permits the operation. Through the display unit 21b, notification of permission of the operation is displayed on the operation management client 10 (step S207).

The authority determining unit 21d operates the resource in cooperation with the server RM 22, the software RM 23, the network RM 24, and the storage RM 25 (step S208). Based on a result of the operation, the authority determining unit 21d updates the system resource DB 26 (step S209).

Thereafter, it is determined whether the input receiving unit 21c has received a logout request (step S210). If the input receiving unit 21c has not received a logout request, the process control returns to step S203, and another request for operating a resource is received. If the input receiving unit 21c has received a logout request, the process ends.

As described above, the authority determining unit 21d determines whether an administrator has administrative right on a domain or a service group that includes a resource subjected to operation. The authority determining unit 21d accepts the resource operation only when the administrator has administrative right. Accordingly, administrative right can be established with respect to units of domain or service group.

Figure 24:
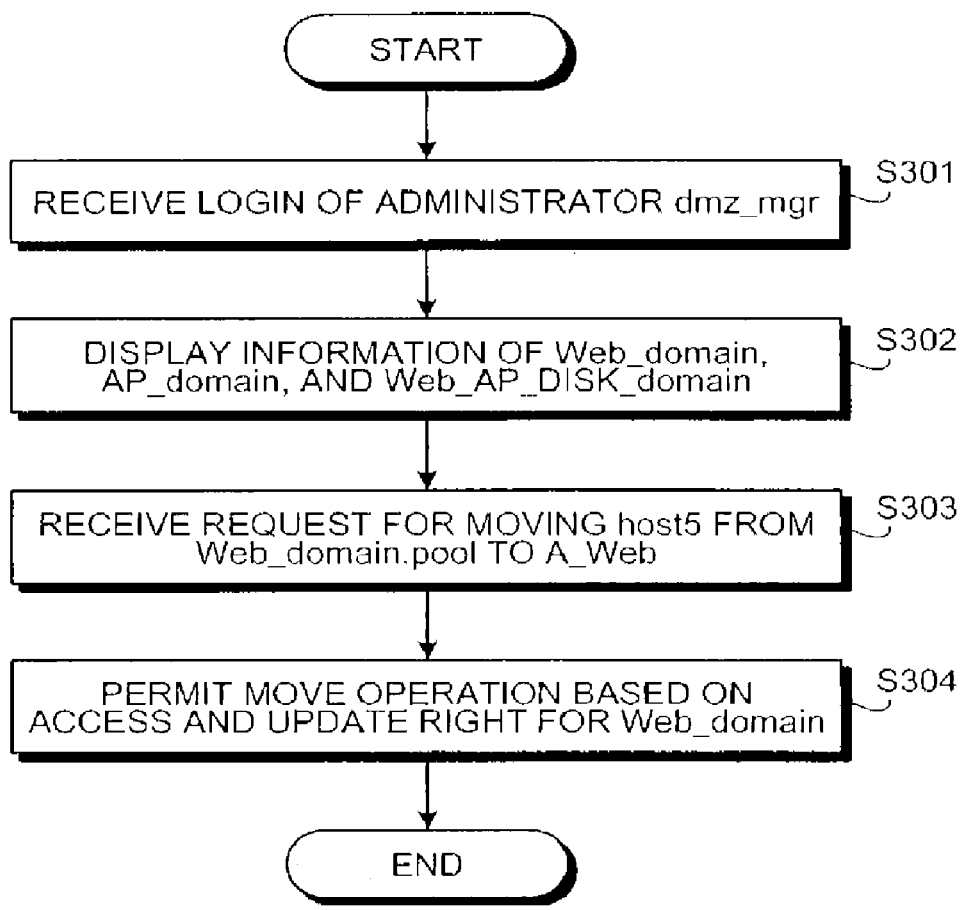
FIG. 24 is a flowchart of a first example of the resource operation performed by the system resource manager in response to a resource-operation request from an administrator.

In the following, examples are described of the resource operation performed by the system resource manager 21 in response to a resource-operation request from an administrator referring to FIGS. 24 to 29. FIG. 24 is a flowchart of a first example of the resource operation performed by the system resource manager 21 in response to a resource-operation request from an administrator.

As shown in FIG. 24, upon receiving a login request from an administrator "dmz_mgr" (step S301), the system resource manager 21 refers to the administrator role data 1184 shown in FIG. 21. According to the administrator role data 1184, the administrator "dmz_mgr" has access and update right on three domains "Web_domain", "AP_domain", and "Web_AP_DISK_domain", and the system resource manager 21 displays information on the server domains "Web_domain" and "AP domain", and the storage domain "Web_AP_DISK_domain" (step S302).

Figure 25:
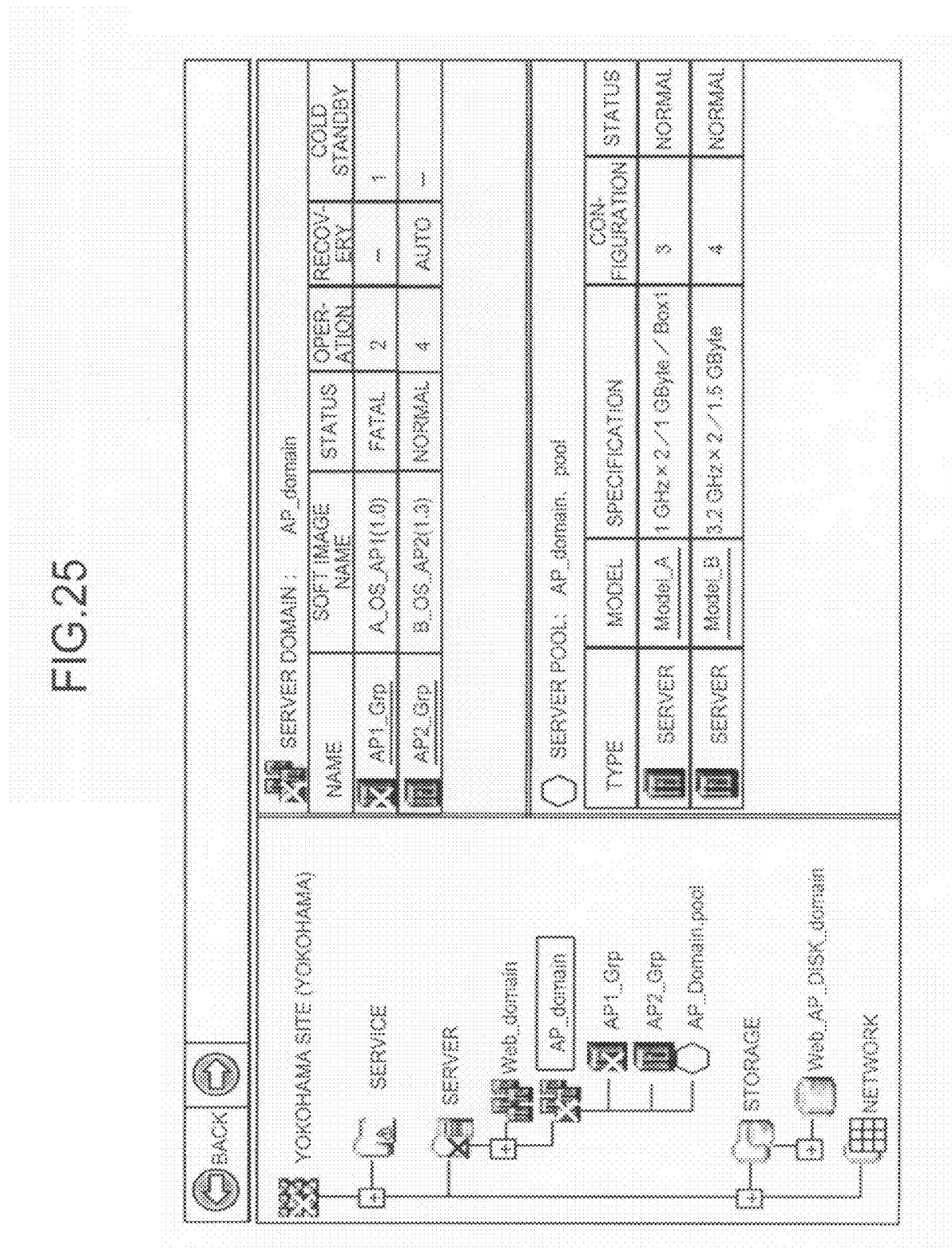
FIG. 25 is a view of an example of a resource-management screen displayed on an operation management client for an administrator who has administrative right on domains.

FIG. 25 is a view of an example of a resource-management screen displayed on the operation management client 10 for an administrator who has administrative right on domains. In this example, the server domains "Web_domain" and "AP_domain", and the storage domain "Web_AP_DISK_domain" are displayed, and, in response to selection of "AP_domain", details thereof are also displayed.

The system resource manager 21 receives a request for moving "host5" from "Web_domain.pool" to "A_Web" from the administrator "dmz_mgr" (step S303). Referring to the server group data 810 shown in FIG. 16 and the provisioning configuration data 960 shown in FIG. 17, "host5" and "A_Web" belong to "Web_domain". Referring to the administrator role data 1184, the administrator "dmz_mgr" has access and update right on "Web_domain". Accordingly, the system resource manager 21 permits the move operation (step S304).

Figure 26:
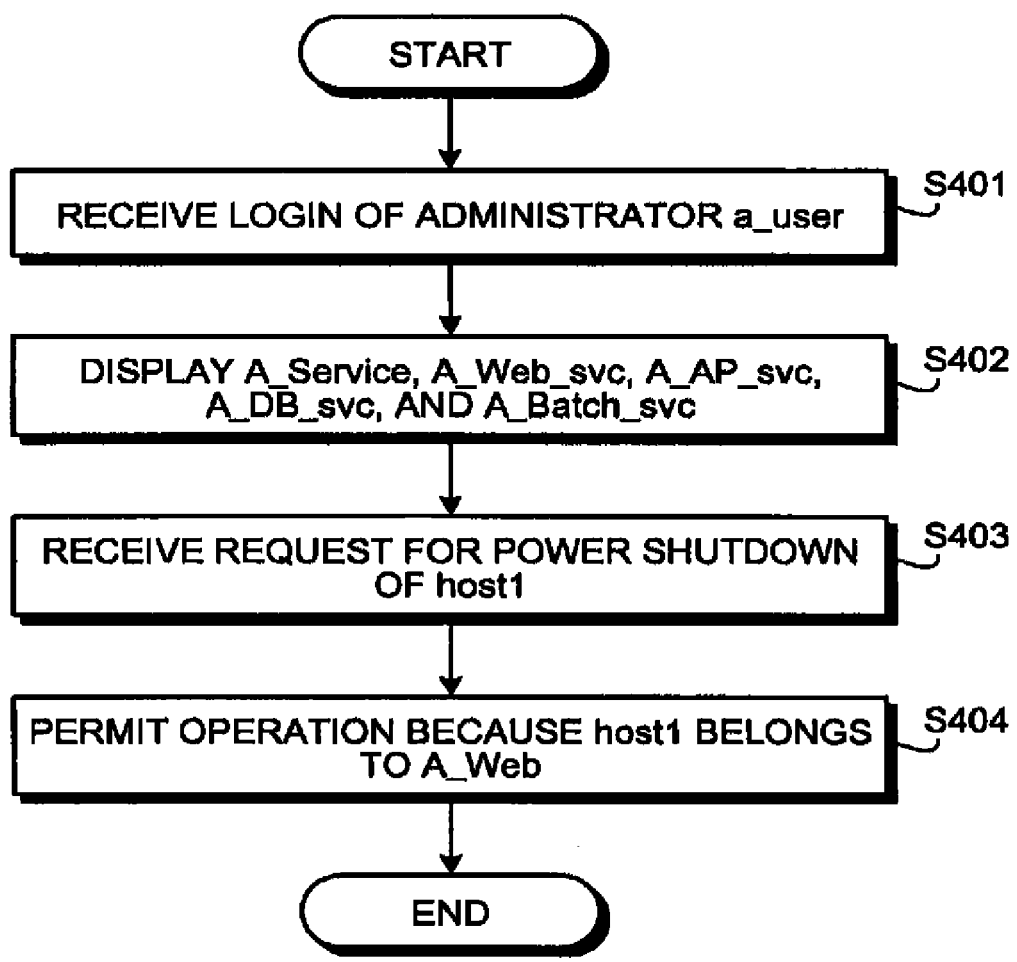
FIG. 26 is a flowchart of a second example of the resource operation performed by the system resource manager in response to a resource-operation request from an administrator.

FIG. 26 is a flowchart of a second example of the resource operation performed by the system resource manager 21 in response to a resource-operation request from an administrator.

As shown in FIG. 26, the system resource manager 21 first receives a login request from an administrator "a_user" (step S401). Referring to the administrator role data 1184, the administrator "a_user" has access and update right on a service group "A_service". Referring to the service group data 1182 shown in FIG. 19, "A_service" includes services "A_Web_svc", "A_AP_svc", "A_DB_svc", and "A_Batch_svc". Referring to the service data 1181 shown in FIG. 18, "A_Web_svc" is provided by a server group "A_Web", "A_AP_svc" is provided by a server group "A_AP", "A_DB_svc" is provided by a server group "A_DB", and "A_Batch_svc" is provided by a server group "A_Batch". Accordingly, the system resource manager 21 displays information on the service group "A_service", and the server groups "A_Web", "A_AP", "A_DB", and "A_Batch" on which the administrator "a_user" has access and update right (step S402).

Figure 27:
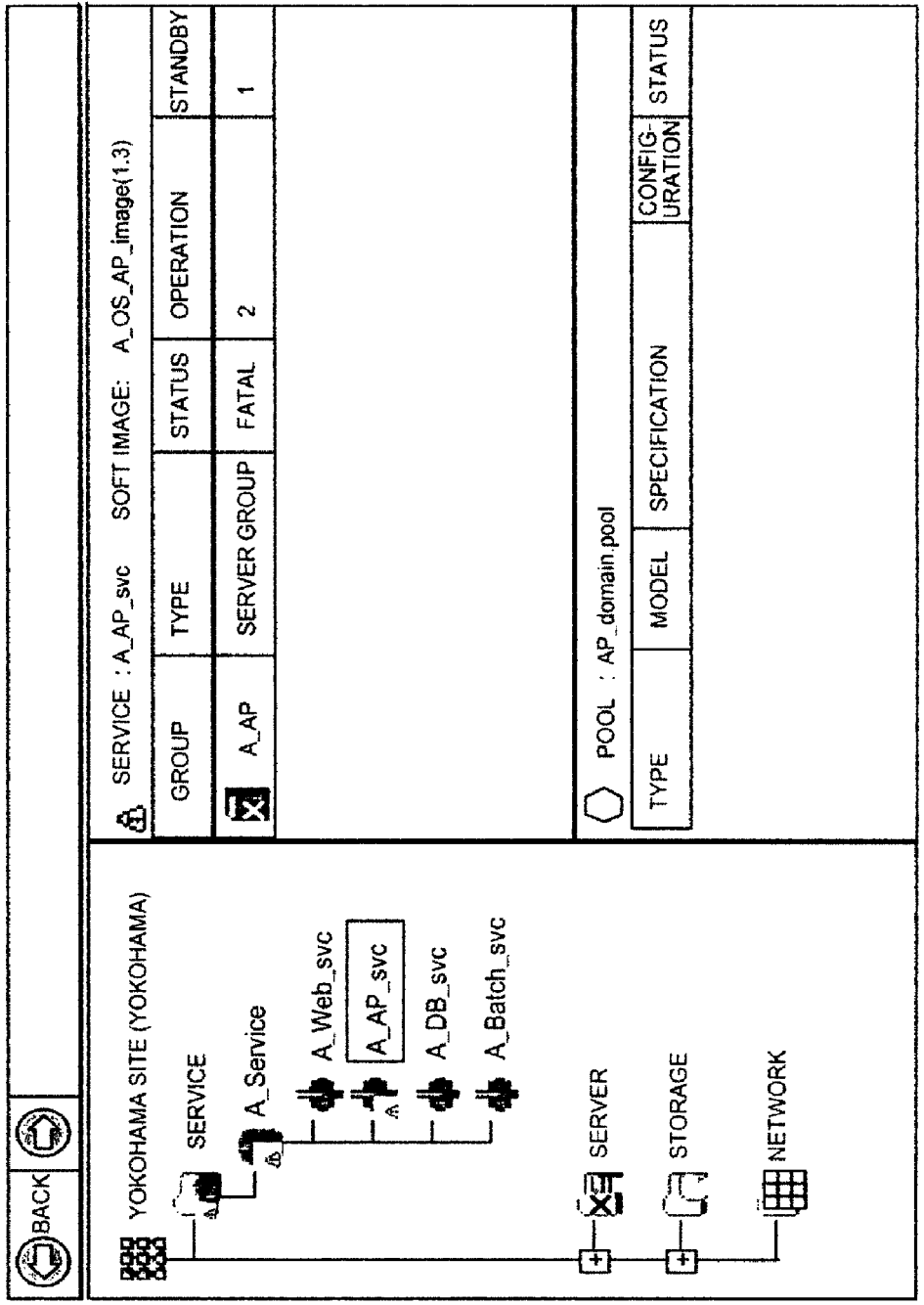
FIG. 27 is a view of an example of a resource-management screen displayed on the operation management client for an administrator who has administrative right on service groups.

FIG. 27 is a view of an example of a resource-management screen displayed on the operation management client 10 for an administrator who has administrative right on service groups. In this example, the service group "A_service" and the services "A_Web_svc", "A_AP_svc", "A_DB_svc", and "A_Batch_svc" that constitute the service group "A_service" are displayed. Further, the service "A_AP_svc" is selected, and the server group "A_AP" that provides the service "A_AP_svc" and a server pool "AP_domain.pool" of "A_AP" are displayed.

The system resource manager 21 receives a request for power shutdown of "host1" from the administrator "a_user" (step S403). Referring to the provisioning configuration data 960, "host1" belongs to "A_Web". Referring to the administrator role data 1184, the administrator "a_user" has access and update right on "A_Web". Accordingly, the system resource manager 21 permits the power-shutdown operation (step S404).

FIG. 28 is a flowchart of a third example of the resource operation performed by the system resource manager 21 in response to a resource-operation request from an administrator.

As shown in FIG. 28, the system resource manager 21 receives a request for using "host5" in "A_Web_svc" from the administrator "dmz_mgr" (step S501). Referring to the provisioning configuration data 960, the service data 1181, and the service group data 1182, "host5" and "A_Web" that provides "A_Web_svc" belong to "Web_domain". Referring to the administrator role data 1184, the administrator "dmz_mgr" has access and update right on "Web_domain". Accordingly, the system resource manager 21 permits the request for usage (step S502).

The system resource manager 21 receives a request for moving "host5" to "A_Web" from the administrator "a_user" (step S503). At step S502, "A_Web_svc" has been granted the usage right of "host5". Referring to the service data 1181 and the service group data 1182, "A_Web" provides "A_Web_svc" belonging to "A_service". Referring to the administrator role data 1184, the administrator "a_user" has access and update right on "A_service". Accordingly, the system resource manager 21 permits the move operation (step S504).

FIG. 29 is a flowchart of a fourth example of the resource operation performed by the system resource manager 21 in response to a resource-operation request from an administrator.

As shown in FIG. 29, the system resource manager 21 receives a request for using "A_DB.pool" in "A_DB_svc" from the administrator "db_mgr" (step S601). Referring to the pool group data 350 shown in FIG. 10, the service data 1181, and the service group data 1182, "A_DB.pool" and "A_DB" that provides "A_DB_svc" belong to "DB_domain". Referring to the administrator role data 1184, the administrator "db_mgr" has access and update right on "DB_domain". Accordingly, the system resource manager 21 permits the request for usage (step S502).

The system resource manager 21 receives a request for moving "host15" to "A_DB.pool" from the administrator "db_mgr" (step S603). Referring to the pool group data 350 and the provisioning configuration data 960, "host15" and "A_DB.pool" belong to "DB_domain". Referring to the administrator role data 1184, the administrator "db_mgr" has access and update right on "DB_domain". Accordingly, the system resource manager 21 permits the move operation (step S604).

The system resource manager 21 receives a request for moving "host15" to "A_DB" from the administrator "a_user" (step S605). From step S604 onwards, "host15" is included in "A_DB.pool". Referring to the service data 1181 and the service group data 1182, "A_DB" provides a service "A_DB_svc" that belongs to "A_service". Referring to the administrator role data 1184, the administrator "a_user" has access and update right on "A_service". Accordingly, the system resource manager 21 permits the move operation (step S606).

A computer that executes the operation management program according to the embodiment is explained below. FIG. 30 is a diagram of a computer that executes the operation management program according to the embodiment. Incidentally, a computer 1200 corresponds to the site management server 20 shown in FIG. 3.

As shown in FIG. 3, the computer 1200 includes an input/output interface 1210, a LAN interface 1220, a RAM 1230, an HDD 1240, and a CPU 1250, which are connected one another via a bus 1260.

The input/output interface 1210 is an interface to an input device such as a mouse and a keyboard and a display device such as a liquid crystal display. The LAN interface 1220 is an interface to connect the computer 1200 to LAN.

The RAM 1230 is a storage device to store programs executed by the CPU 1250 and data read from the HDD 1240. The HDD 1240 is a hard disk drive on which an operation management program 1241 is installed. System resource information 1231 read from the system resource DB 26 is stored in the RAM 1230. The system resource information 1231 includes administrator role information 1231a on administrator role.

The CPU 1250 is a central processing unit that executes the operation management program 1241 installed on the HDD 1240. With the execution of the operation management program 1241, the system resource manager 21 is implemented as a system resource manager process 1251.

The operation management program 1241 is stored in a portable physical medium such as a flexible disk (FD), a CD-ROM, a DVD disk, a magnetic optical disk, and an IC card. The operation management program 1241 can also be stored in another computer that is connected to the computer 1200 via a network such as the Internet. From such a medium, the operation management program 1241 is installed on the HDD 1240.

As described above, according to the embodiment, the system resource DB 26 stores therein administrative right information corresponding to domains and service groups, domain information, and service group information. The authority determining unit 21d of the system resource manager 21 determines whether to accept a request for operating a resource based on whether an administrator has administrative right on a domain or a service group that includes the resource. Thus, administrative right can be easily established on a resource on domain or service group basis.

While the embodiment is explained in context with a server domain including three domains: the web domain 4, the AP domain 5, and the DB domain 6, the present invention is not limited to such an implementation. The present invention is similarly applicable to a server domain including any number of domains.

As described above, according to one aspect of the present invention, administrative right can be set for a resource domain that is a group of resources each having a uniform physical wire connection to other resources. Thus, administrative right can be set easily from a viewpoint of security level of the resources and a service.

Furthermore, according to another aspect of the present invention, an administrator can effectively operate authorized resources, which reduces load to manage resources.

Moreover, according to still another aspect of the present invention, administrative right can be set on resource domains being clearly presented. Thus, administrative right can be reliably set on the resource domains.

Furthermore, according to still another aspect of the present invention, administrative right can be set from a viewpoint of service groups. Thus, administrative right can be set easily from a viewpoint of services.

Moreover, according to still another aspect of the present invention, an administrator can effectively operate authorized resources, which reduces load to manage resources.

Furthermore, according to still another aspect of the present invention, administrative right can be set on service groups being clearly presented. Thus, administrative right can be reliably set for services.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable, non-transitory medium that stores therein a computer program causing a computer that controls an access to a system including a plurality of server devices, a first firewall device and a second firewall device to execute:
   generating information indicating a resource domain that is a set of resources including a set of server devices placed at a communication path between the first firewall device and the second firewall device and information indicating a service group that is a set of services related to server devices performing a service processing in cooperation;
   storing information, in a storage unit, in which the information indicating the resource domain or the service group is associated with information indicating whether an access is permitted or not; and
   determining, upon receiving an access request to a server device included in the resource domain or the service group, whether an access is permitted or not based on the information indicating whether an access is permitted or not stored in the storage unit, the information being associated with any one of the resource domain and the service group.

2. The computer-readable, non-transitory medium according to claim 1, wherein the computer program further causes the computer to execute
   outputting, before a start of receiving an access request to a server device included in the resource domain or the service group, a display instruction that makes a display device to create a display based on the information indicating the resource domain or the service group and the information indicating whether an access is permitted or not stored in the storage unit.

3. The computer-readable, non-transitory medium according to claim 1, wherein the information indicating whether an access is permitted or not is information indicating whether a reference processing is permitted or not, or a reference processing and an updating processing are permitted or not.

4. A control method of a computer that controls an access to a system including a plurality of server devices, a first firewall device and a second firewall device, the control method comprising:

generating information indicating a resource domain that is a set of resources including a set of server devices placed at a communication path between the first firewall device and the second firewall device and information indicating a service group that is a set of services related to server devices performing a service processing in cooperation;

storing information, in a storage unit, in which the information indicating the resource domain or the service group is associated with information indicating whether an access is permitted or not; and determining, upon receiving an access request to a server device included in the resource domain or the service group, whether an access is permitted or not based on the information indicating whether an access is permitted or not stored in the storage unit, the information being associated with any one of the resource domain and the service group.

5. A control apparatus for controlling an access to a system including a plurality of server devices, a first firewall device and a second firewall device, the control apparatus comprising:

a generating unit that generates information indicating a resource domain that is a set of resources including a set of server devices placed at a communication path between the first firewall device and the second firewall device and information indicating a service group that is a set of services related to server devices performing a service processing in cooperation;

a storage-controlling unit that stores information, in a storage unit, in which the information indicating the resource domain or the service group is associated with information indicating whether an access is permitted or not; and a determining unit that determines, upon receiving an access request to a server device included in the resource domain or the service group, whether an access is permitted or not based on the information indicating whether an access is permitted or not stored in the storage unit, the information being associated with any one of the resource domain and the service group.

* * * * *